United States Patent
Raizer

(10) Patent No.: US 10,259,649 B2
(45) Date of Patent: Apr. 16, 2019

(54) AUTOMATIC WAREHOUSE SYSTEM

(71) Applicant: BionicHIVE Ltd, Moshav Ein Habsor (IL)

(72) Inventor: Liran Raizer, Moshav Ein Habsor (IL)

(73) Assignee: BIONICHIVE LTD, Moshav Ein Habsor (IL)

( * ) Notice: Subject to any disclaimer, the term of this patent is extended or adjusted under 35 U.S.C. 154(b) by 130 days.

(21) Appl. No.: 15/325,680

(22) PCT Filed: Jul. 9, 2015

(86) PCT No.: PCT/IL2015/050714
§ 371 (c)(1),
(2) Date: Jan. 11, 2017

(87) PCT Pub. No.: WO2016/009423
PCT Pub. Date: Jan. 21, 2016

(65) Prior Publication Data
US 2017/0158430 A1    Jun. 8, 2017

Related U.S. Application Data

(60) Provisional application No. 62/023,827, filed on Jul. 12, 2014.

(51) Int. Cl.
*G06F 7/00* (2006.01)
*B65G 1/137* (2006.01)
(Continued)

(52) U.S. Cl.
CPC ............ *B65G 1/137* (2013.01); *B65G 1/04* (2013.01); *B65G 1/065* (2013.01); *G06Q 10/08* (2013.01)

(58) Field of Classification Search
None
See application file for complete search history.

(56) References Cited

U.S. PATENT DOCUMENTS 6,327,519 B1 * 12/2001 Ostwald ............ G11B 15/6835
                                                    318/568.13
2006/0058912 A1 * 3/2006 Karlen .................... B63B 25/22
                                                         700/214
(Continued)

FOREIGN PATENT DOCUMENTS

WO    2010/100513 A2    9/2010
WO    2014/001558 A1    1/2014

OTHER PUBLICATIONS

International Search Report of PCT/IL2015/050714, dated Nov. 8, 2015.
(Continued)

*Primary Examiner* — Yolanda R Cumbess
(74) *Attorney, Agent, or Firm* — Jeffri A. Kaminski; Venable LLP

(57) ABSTRACT

The invention is an automatic system for picking and placing boxes on shelves in a warehouse. The system comprises a set of autonomous mobile robots; a network of vertical and horizontal rails that are parallel to the vertical support posts and horizontal shelves of the shelving system in the warehouse; and a Real Time Traffic Management (RTTM) server, which is a central processing server configured to communicate with the robots and other processors and servers in the warehouse. The system is characterized in that the robots comprise a set of on-board sensors, a processor, software, and other electronics configured to provide them with three-dimensional navigation and travel capabilities that enable them to navigate and travel autonomously both along the floor and up the vertical rails and along the horizontal rails of the network of rails to reach an exact location on the floor or shelving system of the warehouse.

18 Claims, 18 Drawing Sheets

(51) Int. Cl.
*B65G 1/04* (2006.01)
*B65G 1/06* (2006.01)
*G06Q 10/08* (2012.01)

(56) References Cited

U.S. PATENT DOCUMENTS

| | | | | |
|---|---|---|---|---|
| 2008/0167817 A1* | 7/2008 | Hessler | ............... | G01C 21/005 |
| | | | | 701/514 |
| 2008/0294287 A1* | 11/2008 | Kawano | ............... | B25J 9/1664 |
| | | | | 700/252 |
| 2012/0101627 A1* | 4/2012 | Lert | .................... | B65G 1/1378 |
| | | | | 700/216 |
| 2014/0361077 A1* | 12/2014 | Davidson | .............. | G06Q 10/08 |
| | | | | 235/385 |

OTHER PUBLICATIONS

Written Opinion of PCT/IL2015/050714, dated Nov. 8, 2015.
IPRP of PCT/IL2015/050714, dated Nov. 6, 2016.

* cited by examiner

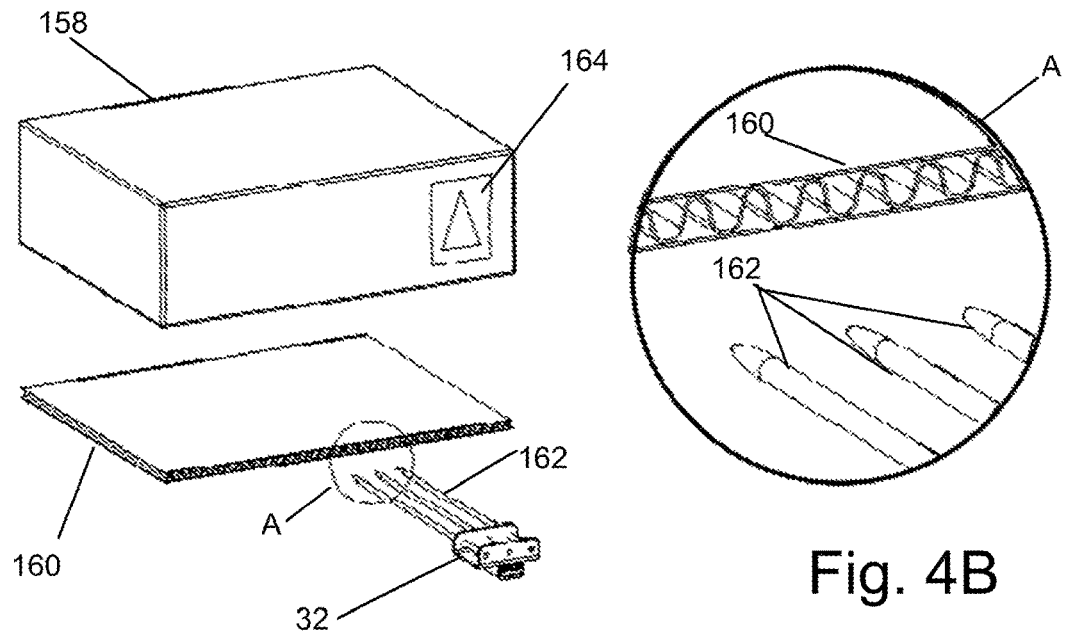
Fig. 4A
Fig. 4B
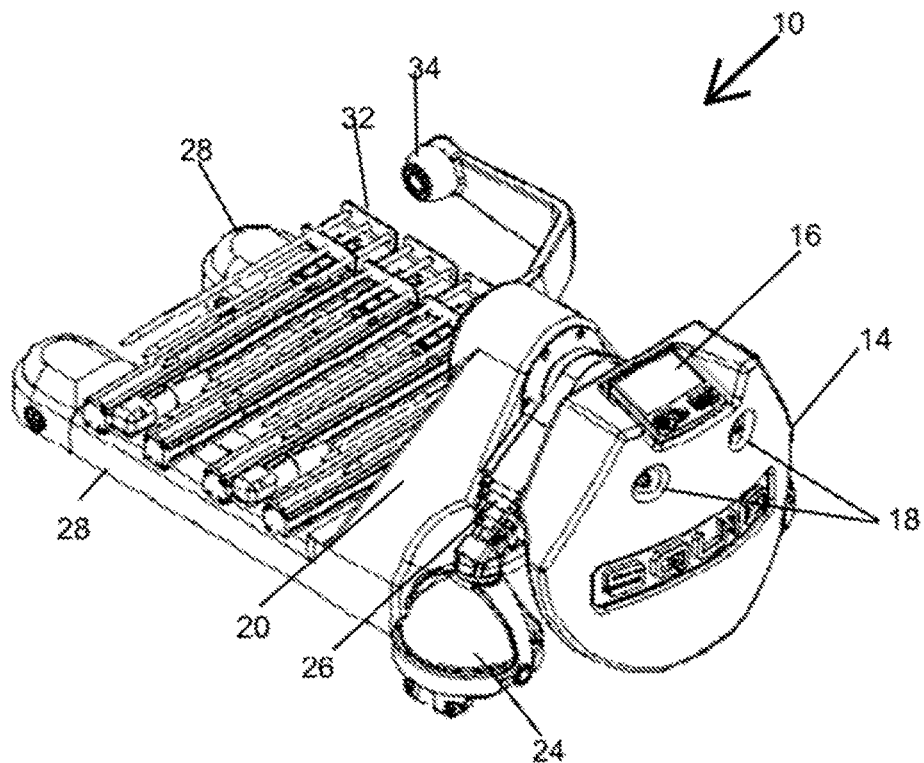
Fig. 5A

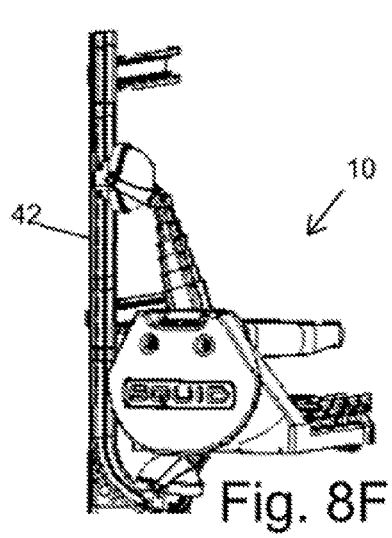
Fig. 8F
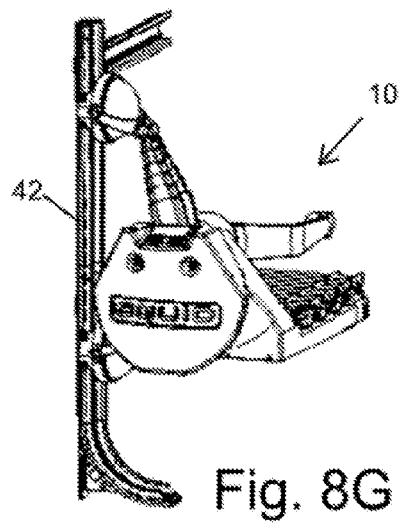
Fig. 8G
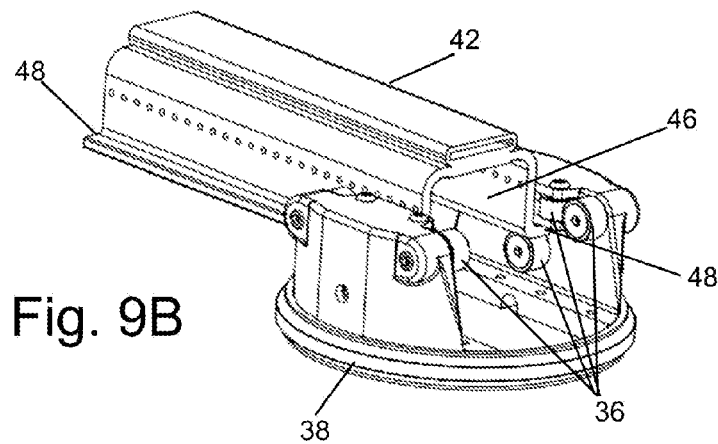
Fig. 9B
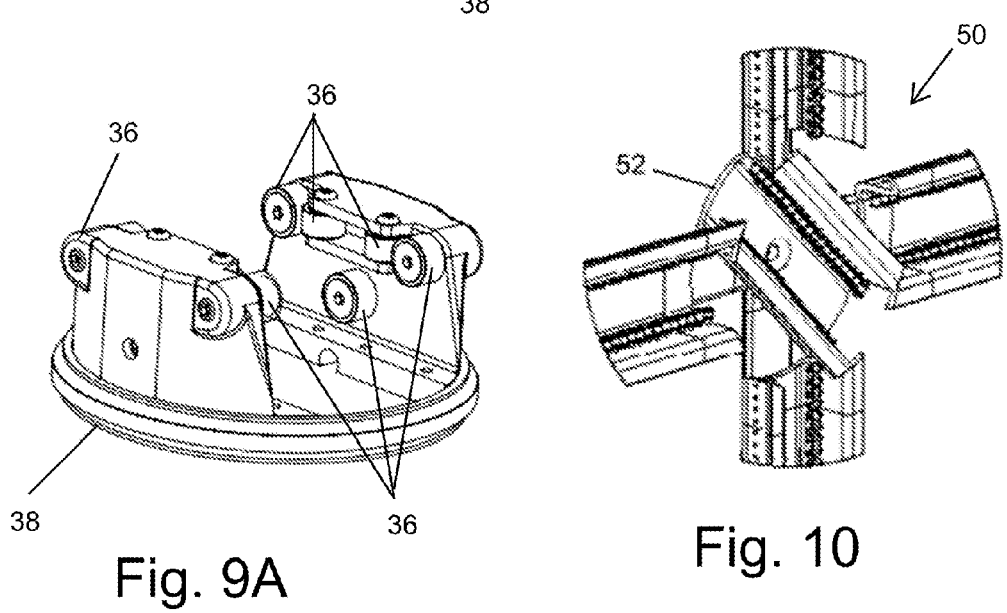
Fig. 9A
Fig. 10

AUTOMATIC WAREHOUSE SYSTEM

CROSS-REFERENCES TO RELATED APPLICATIONS

This application is a U.S. National Stage application of PCT/IL2015/050714, filed 9 Jul. 2015 and published on 21 Jan. 2016 as WO 2016/009423, which claims the benefit of U.S. Provisional Patent Application No. 62/023,827, filed 12 Jul. 2014, both of which are hereby incorporated by reference in their entireties.

FIELD OF THE INVENTION

The invention is from the field of warehouse automation. Specifically the invention is from the field of automated systems for warehouse management.

BACKGROUND OF THE INVENTION

The world of logistics is a never ending challenge of improving efficiency and reducing cost. The largest costs are associated with human labor and storage capacity. In the early 1980s automation based solutions began to be implemented in the logistics arena. Since then these solutions have greatly improved, dramatically reducing operational costs and improving productivity. The caveat is that these automatic solutions come at a great expense in facility and equipment, making these types of solutions available only to companies who can afford the cost and sustain the ROI.

This problem is more critical for small and medium size warehouses (SMWs) which are based on human labor. These businesses are burdened with escalating labor cost, increased demand for delivery times, limited working hours, process control difficulties leading to uneven output, employee turnover requiring a costly training process, season to season volatility, and human errors.

An automatic warehouse solution would provide an answer to many of these issues. However, there are many constraints that are preventing SMWs from implementing current solutions, including:

1. The requirement of a large capital equipment investment.
2. Poor modularity—Prior art automatic solutions require rigorous space and functionality design prior to initialization. For example, if a business needs to reorganize the warehouse area/facility, it requires a very large effort to relocate a crane which runs on specific rails in a specific pit inside the floor.
3. Downtime—Prior art automatic solutions for warehouse management require 3-12 months of "sterile environment" with no disruptions in order to be implemented. That means a business needs to add the cost of either:
   Moving its operation to a temporary facility while implementing; or
   In case of relocation, moving the operation to new location only after implementation; or
   Shutting down the business for the time of implementation.
4. Limited flexibility—Most of the prior art systems are designed to a specific output rate in pre-set conditions and products/containers. Thus the systems cannot cope when it is desired to take on a new customer with different size/shape/weight of products/containers. Most prior art systems are not designed to change their output rate dramatically, thus these systems cannot cope with peak times where a business needs to temporary increase its output.
5. No gradual implementation capability—Most prior art systems require major structural changes in the facility and infrastructures, which means that implementation requires 100% overhaul of an existing warehouse right from the starting gate.
6. Redundancy capability—In most prior art automated solutions to warehouse management failure in a part of the system will stop all operations until the failure is overcome. This situation can be covered in large warehouses with a few locations and overlapping stock, but the meaning of a failure of this nature for a small business with a single warehouse is crucial.

The result of all of these constraints is that virtually the entire SMW logistics sub-segment of the warehouse industry does not have an automatic solution.

It is therefore a purpose of the present invention to provide an automatic warehouse system that is suitable for small and medium sized warehouses.

It is another purpose of the present invention to provide an automatic warehouse system that can be relatively inexpensively and easily added to existing warehouses operated by businesses.

Further purposes and advantages of this invention will appear as the description proceeds.

SUMMARY OF THE INVENTION

In a first aspect the invention is an automatic system for picking and placing boxes on shelves in a warehouse. The system comprises:
  a. a set of autonomous mobile robots;
  b. a network of vertical and horizontal rails that are parallel to the vertical support posts and horizontal shelves of the shelving system in the warehouse; and
  c. a Real Time Traffic Management (RTTM) server, which is a central processing server configured to communicate with the robots and other processors and servers in the warehouse.

The system is characterized in that the robots comprise a set of on-board sensors, a processor, software, and other electronics configured to provide them with three-dimensional navigation and travel capabilities that enable them to navigate and travel autonomously both along the floor and up the vertical rails and along the horizontal rails of the network of rails to reach an exact location on the floor or shelving system of the warehouse.

The modular architecture of the system allows integrating with an already in-use facility with a high level of implementation flexibility and ongoing scalability.

Embodiments of the system of the invention comprise at least one picking station comprising a processor, terminal screen and software dedicated to interface with other processors in the system in order to assist human workers to either pick or put away merchandise.

The robots of the system comprise:
  a. a frame;
  b. a gripper mechanism attached to the top side of the frame that is configured to pick up and place boxes;
  c. a fine positioning sensor used to aid in removing and placing boxes from/on the shelves;
  d. a battery case that houses rechargeable batteries that power the robot; at least one rear wheel attached to the bottom of the frame; and e. two drive and steering units each unit comprising one front wheel and components configured to rotate the front wheel at least 360 degrees about an axis vertical to the floor in order to steer the robot and to rotate the front wheel about a horizontal axis in order to cause the robot to move in the direction that the front wheel is pointing, wherein the drive and steering units are attached to the robot by means of arm units configured to expand, contract, and have other degrees of freedom that allow the robot to engage a vertical rail, to raise itself off the floor, and to move up and along the network of vertical and horizontal rails.

In embodiments of the system of the invention the gripper mechanism comprises an array of micro-pallet lifters, wherein each micro-pallet lifter in the array can be operated independently of the others thereby allowing the robot to handle different sized boxes and maximizing the efficient use of shelf space.

In embodiments of the system of the invention the software in each robot comprises dedicated software and algorithms that are configured to enable the robot to execute navigation, driving, and fine positioning procedures, to pick and put boxes and to monitor the charge of the rechargeable batteries.

In embodiments of the system of the invention the processor of each robot is pre-loaded with dedicated software which includes the warehouse layout, routes, intersections, and designated areas.

In embodiments of the system of the invention the processor, software, and set of on-board sensors are configured to enable each robot to employ anchor point navigation method to carry out tasks assigned to it by the RTTM.

In embodiments of the system of the invention the robots have recoverable communication capability that enables them to carry on with their mission if communication with the RTTM server, picking stations, or other robots is temporarily lost.

In embodiments of the system of the invention the rails of the network of vertical and horizontal rails are attached to an existing shelving system.

In embodiments of the system of the invention the network of vertical and horizontal rails is configured as a free standing structure standing in parallel to the shelving structure.

In embodiments of the system of the invention the robot travels along the network of vertical and horizontal rails by means of its two front wheels that have engaged and become mechanically secured into the rails.

In embodiments of the system of the invention a junction between vertical and horizontal rails is comprised of an open circular area centered at the intersection between the vertical and horizontal rails and a short piece of rail configured to pivot about the center of the circular area such that the short piece of rail is alternately lined up with one or two sections of vertical rail or one or two sections of horizontal rail. In these embodiments the robot is able to change its direction of travel on the network of vertical and horizontal rails from vertical to horizontal or vice versa by stopping with its front wheels on the short piece of rail in two adjacent junctions between vertical and horizontal rails and then rotating the front wheels by ninety degrees.

In embodiments of the system of the invention the network of rails is configured to enable the robot to cross from one side of an aisle to the other without the need to go down to the floor.

In embodiments of the system of the invention the RTTM comprises software that generates tasks, prioritization, traffic control, and energy management instructions, which the server sends to the individual robots In embodiments of the system of the invention real time communication between all robots, picking stations, and RTTM server is handled over industrial grade routers using secured wireless protocol.

In embodiments of the system of the invention each box stored in the warehouse has a micro-pallet made from corrugated fiberboard attached to its bottom.

In embodiments of the system of the invention the processors in the robots, RTTM, and picking stations of the system comprise software that is configured to provide at least one of the following advanced capabilities:
  a. realization of Internet of Things (IoT) scenarios;
  b. self-learning; and
  c. accumulating and analyzing big data sets.

In a second aspect the invention is a robot having three-dimensional navigation and travel capabilities that enable it to navigate and travel both along the ground and up vertical rails and along horizontal rails of a network of rails, the robot comprising:
  a. a frame;
  b. a gripper mechanism attached to the top side of the frame that is configured to pick and place boxes;
  c. a fine positioning sensor used to aid in removing and placing boxes from/on the shelves;
  d. a battery case that houses rechargeable batteries that power the robot;
  e. a command module that houses a processor, software, and other electronics that guide the robot and enable it to carry out its assigned tasks;
  f. a set of on-board sensors that are located at various locations on the robot to aid the robot in navigation and to identify obstacles;
  g. at least one rear wheel attached to the bottom of the frame; and
  h. two drive and steering units each unit comprising one front wheel and components configured to rotated the front wheel 360 degrees about an axis vertical to the floor in order to steer the robot and to rotate the front wheel about a horizontal axis in order to cause the robot to move in the direction that the front wheel is pointing, wherein the drive and steering units are attached to the robot by means of arm units configured to expand, contract, and have other degrees of freedom that allow the robot to engage a vertical rail, to raise itself off the floor, and to move up and along the network of vertical and horizontal rails.

All the above and other characteristics and advantages of the invention will be further understood through the following illustrative and non-limitative description of embodiments thereof, with reference to the appended drawings.

BRIEF DESCRIPTION OF THE DRAWINGS

FIG. 4A schematically illustrates one method that can be used by the invention for moving boxes around the warehouse and efficiently stacking them on and picking them from shelves;

FIG. 4B is an enlarged view of area "A" in FIG. 4A;

FIGS. 5A to 5D are schematic top perspective, bottom perspective, side, and top views respectively of a robot of the system of the invention;

FIGS. 8A to 8G symbolically show different stages in the process of the robot of the system of the invention leaving the floor of the warehouse and climbing e vertical rail attached to the shelving;

FIGS. 9A and 9B schematically show the means by which the robot is mechanically locked to the rails;

FIG. 10 schematically shows a junction between vertical and horizontal rails;

DETAILED DESCRIPTION OF EMBODIMENTS OF THE INVENTION

Figure 1:
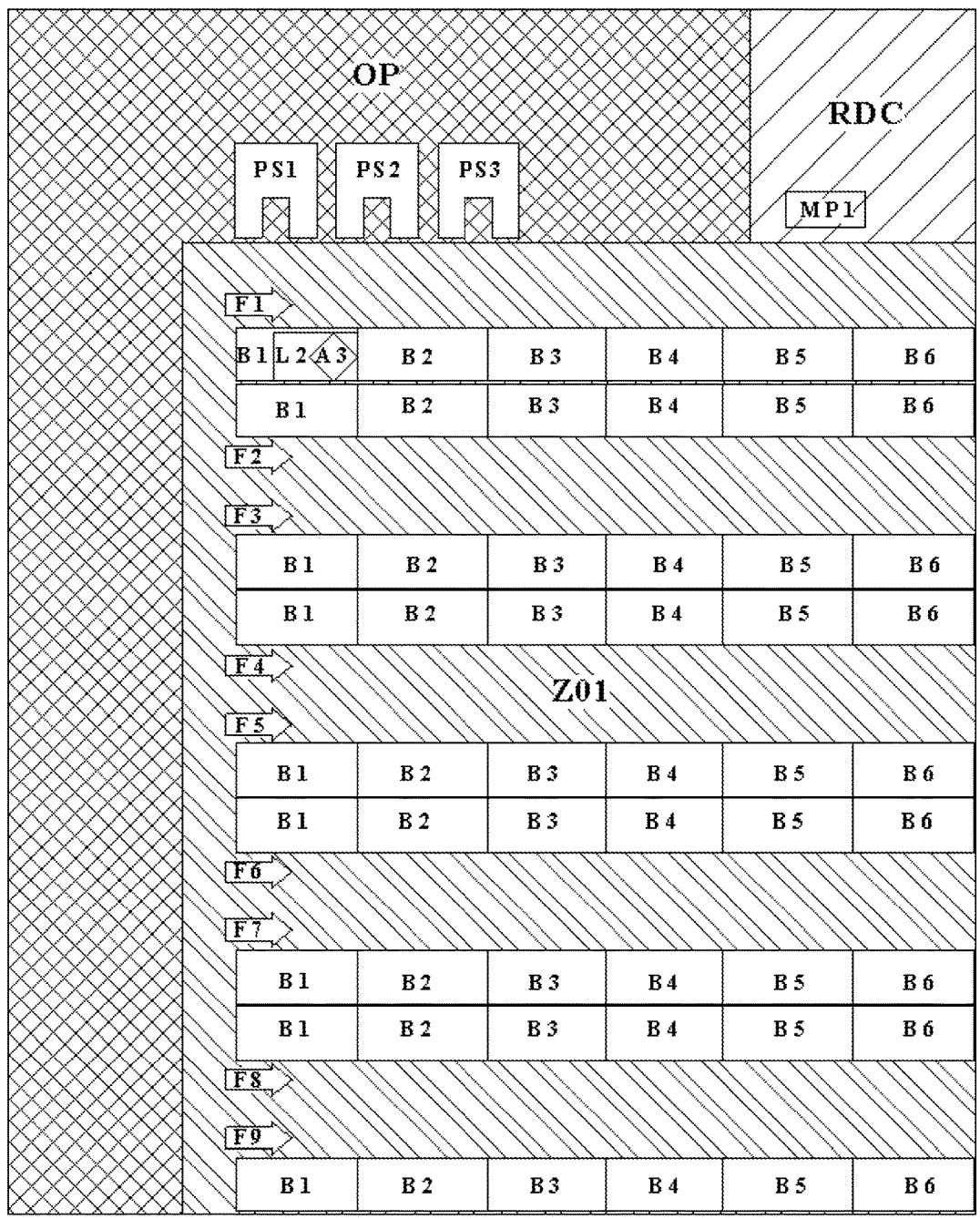
FIG. 1 schematically shows the floor plan of a typical warehouse, which could be automated by addition of the system of the invention.

The invention is an automatic warehouse solution consisting of multiple multidirectional autonomous robots that are deployed by a central computer and a picking station. The robots of the system have 3 dimensional movement capabilities. Utilizing at least one pair of motorized arms, the robots navigate both along the ground and up and along the shelves to the exact desired location. The system's rails, which allow for the vertical and horizontal movement capabilities of the robots along the shelving, are mounted on or parallel to the vertical supports and shelves of the warehouse.

Some of the features of the invention that makes the system unlike existing systems are:

The robots in the system of the invention use "anchor point navigation". That is they use less accurate sensing and motions when travelling on the floor in order to arrive at the designated destination as rapidly and efficiently as possible and employ dedicated algorithms and more precise sensing only when near anchor points, i.e. fixed specific locations in the warehouse such as terminals (locations at which the robot leaves the floor and climbs a vertical rail of the shelving system), picking stations, and battery charging stations. This feature provides significant savings in energy and load on the sensor and navigation system since the robot has to check exactly where it is only when approaching its destination.

Unlike existing systems, the system of the invention is designed to "plug and play" in any warehouse, integrating with an already in-use facility, shelving system and infrastructure resources of a conventional warehouse. The system of the invention is capable to be part of world trend called RAAS (Robot As A Service), the rails, servers and software of the system are sold to the owner of the warehouse but some or all of the robots are leased or rented providing great flexibility to add or remove robots from the system as requirements change. Thus, the capital equipment investment for a small and medium warehouse (SMW) would be a fraction of the cost of the most modest automatic warehouse solution available today.

In addition, the invention is an expandable system whose modularity allows a high level of implementation flexibility and ongoing scalability. Clients can also choose an "aisle by aisle" implementation process and add more infrastructure as the budget allows and/or the business grows. This combined with RAAS means that can economically increase/decrease scalability in peak or off season.

The system of the invention comprises the following components, which will be described in detail herein below:

1. Robots: A set of autonomous centrally controlled mobile robots that bring desired boxes to and from the picking station. The robots have 3 dimensional travel capabilities enabling them to travel along the ground and up and along the shelves. The robots are pre-loaded with proprietary software which includes the warehouse layout, routes, intersections, and designated areas (this mapping survey is recorded by a "Survey Mode" of the robot's software). Each robot utilizes dedicated maneuvering algorithms and a proprietary "Fine Positioning" procedure to enable precise, quick and efficient loading.

2. Rails: The rails of the system are either mounted on the conventional existing shelving structure of the warehouse or erected in parallel to the shelving as a self-supported, i.e. stand-alone, structure. The robots engage the rails only at a designated "terminal" located on the floor and use these rails to maneuver vertically and horizontally. The engineering of the "junctions" between vertical and horizontal rails is novel allowing the robots to automatically change direction from vertical to horizontal and vice versa. The shape of the profile of the rails and the design of the robot's drive wheels prevent the robots from disengaging from the rails during those maneuvers. The rails can also be configured to enable the robot to cross from one side of an aisle to the other without the need to go down to the floor.

3. Picking Station: The picking station is a sorting workstation where a human worker is guided by the system to efficiently handle several orders concurrently. A terminal screen and indication lights assist the human worker to either pick or put away the merchandise in a very high output while keep its work very accurate in a safe, quiet, and comfortable workspace. The structural components of the picking station are generally those that were present in the warehouse prior to retrofitting the warehouse with the system of the invention but the picking station software is dedicated to interface with the new system.
4. Software: The system is controlled by a central processing server known herein as the Real Time Traffic Management (RTTM) server. The RTTM server, which is unique to the invention, is configured to communicate with the robots, picking stations and the warehouse management system (WMS) that normally exists in the warehouse to receive information normally handled by these systems, e.g. customer orders, priorities, and merchandise location. (The WMS is sometimes known by other names, e.g. Enterprise Resource Planning (ERP) system and storage management software.) Software in the RTTM server uses the information from the WMS as input to generate tasks, prioritization, traffic control, and energy management instructions, which the server sends to the individual robots. A traffic management engine and data analysis process run on the RTTM server, synchronizing tasks which are executed by the robots. The system enables multi-tasks to be carried out simultaneously. The RTTM server software also includes an information manager, task processor, database, logging capabilities, real-time alerts and system control interface. The RTTM also reports back information such as the current status of in-line tasks, open missions, errors, etc. to the WMS.
5. Embodiments of the system of the invention are provided with back-up servers, processors, and other components to provide redundancy and limit the number of critical points that could lead to system failure to a minimum.
6. Navigation, driving, fine positioning procedure and monitoring the charge of the batteries is done by processors in every robot. The drivers and controllers in each robot execute dedicated algorithms to fully enable the robot's multi-channel degrees of freedom and to use the flexibility of the system's design. The robots have recoverable communication capability that enables them to carry on with their mission if communication with the RTTM server, picking stations, or other robots is lost, for example if they travel through a wireless dead zone in the warehouse, and to reconnect automatically to the system when they pass out of the dead zone.
7. Picking station software enables communication with the robots and receiving and sending order consolidation data from/to the RTTM server.
8. Real time communication between all robots, picking stations and server is handled over industrial grade routers using secured wireless protocol.

FIG. 1 schematically shows the floor plan of a typical warehouse, which has been automated by addition of the system of the invention. The warehouse is divided into three main sections: a Receiving and Dispatch Center (RDC), an Operations Area (OP), and a storage area, which can be divided into zones (for example zone Z01 is shown in FIG. 1. All bulk goods from suppliers enter and filled orders of customers leave the warehouse through the RDC. The operations area comprises at least one picking station; the number depending on the size of the warehouse and the number/size of the orders to be filled, for example three picking stations PS1, PS2, and PS3 are shown in the figure. Human workers man the picking stations and load boxes containing merchandise for the robots of the system to place on the shelves in the storage area or to receive boxes containing items required to fill customer's orders that the robots have retrieved from the storage area. In a warehouse comprising a system of the invention the RDC also may comprise at least one micro-pallet stand 110 (designated MP1 in FIG. 1). Micro-pallets, which will be described herein below, are one method that can be used to engage and carry boxes to obtain the maximum benefit from the system. The storage area comprises a plurality of shelving units consisting of a framework commonly made up of horizontal and vertical pieces of angle iron that support the shelves. The vertical supports divide the shelving unit into sections call bays (B1, B2, . . . ). The sides of the shelving units that face the aisles between units are called faces (F1, F2, . . . ). A given row of shelves in a bay is designated by a level number and can hold several boxes arranged in one or more side-by-side stacks each comprising one or more boxes stacked one upon the other. In order to be able to provide a precise location for a specific box in the storage area, the bays are divided into areas that represent the number of stacks in the bay. Thus the exact location of a box in the warehouse is designated by an address comprising numbers, letters, signs, color, etc. representing the zone, face, bay, level, and specific location. The location of a specific box in the storage area can be designated in other ways, for example using x,y,z coordinates in a coordinate system of the rail system of the invention or an indoor positioning system.

Figure 2A:
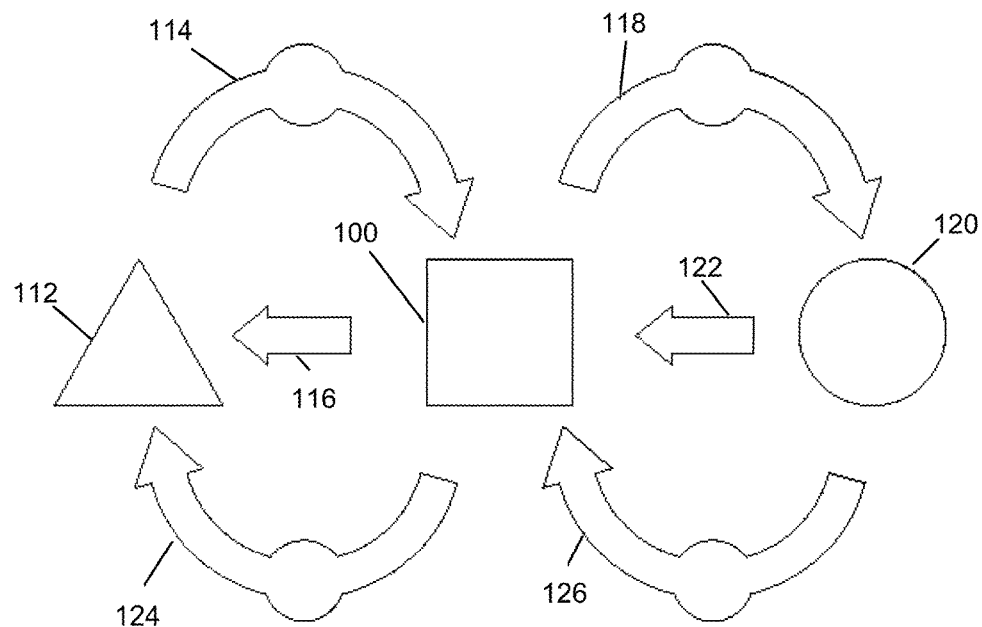
FIG. 2A is a flow chart that symbolically shows the main steps in the merchandise flow from supplier to customer.

FIG. 2A is a flow chart that symbolically shows the main steps in the flow of goods through a non-automated warehouse. Customer 112 places an order 114 that arrives at warehouse 100. If all items in the customer's order are in stock then items 116 are dispatched from warehouse 100 to customer 112 along with a dispatch note 124. If the warehouse does not currently contain an item from the customer's order it is recorded as a back order and an order 118 is sent to supplier 120 who sends the ordered goods 122 and a goods received note 126 to the warehouse. When the missing item or items from the customer's original order arrives at the warehouse all order items are consolidated and sent to the customer.

Figure 2B:
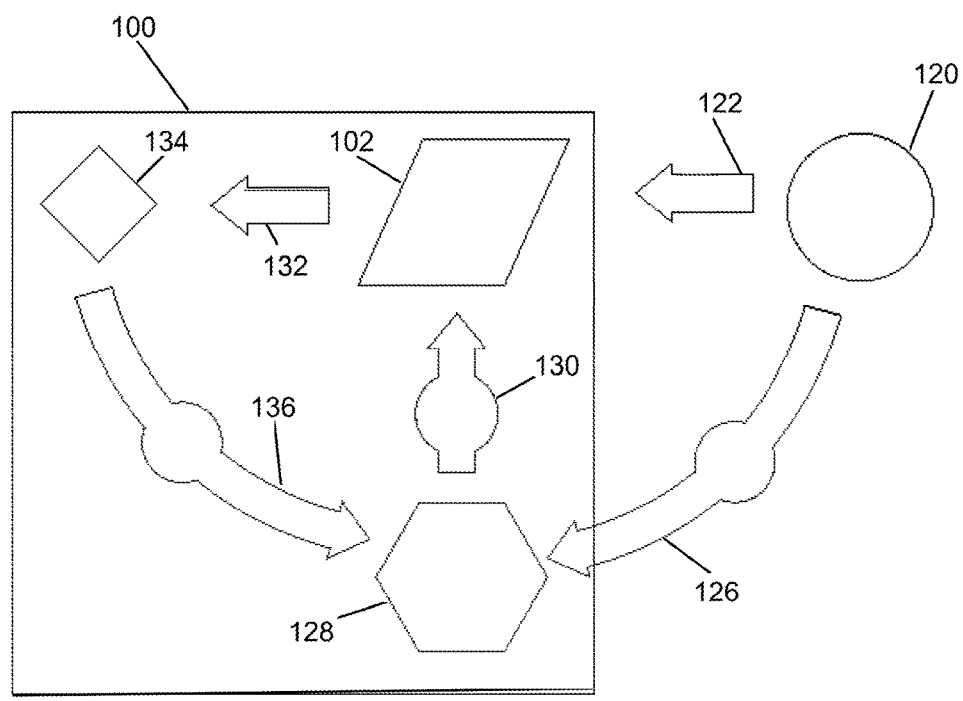
FIG. 2B is a flow chart that symbolically shows the main steps followed by the Warehouse Management System (WMS) when goods arrive at the warehouse.

FIG. 2B is a flow chart that focuses on the receiving process at the warehouse level symbolically showing the main steps that are carried out when goods arrive at a non-automated warehouse. The supplier 120 sends goods 122 to the RDS 102 of warehouse 100 and a goods received note to the WMS128. WMS calculates the volume of each box (either from pre-measured dimensions stored in the data base of WMS or from measurements taken when the box enters the RDC 102. WMS 128 then generates a put-a-way note 130, which contains the addresses at which to store the goods, which it sends to RDS 102. Items 132 are carried by workers to the designated address 134 in the storage area. After an item has been stored a put-a-way confirmation message 136 is sent by the worker to the WMS.

Figure 2C:
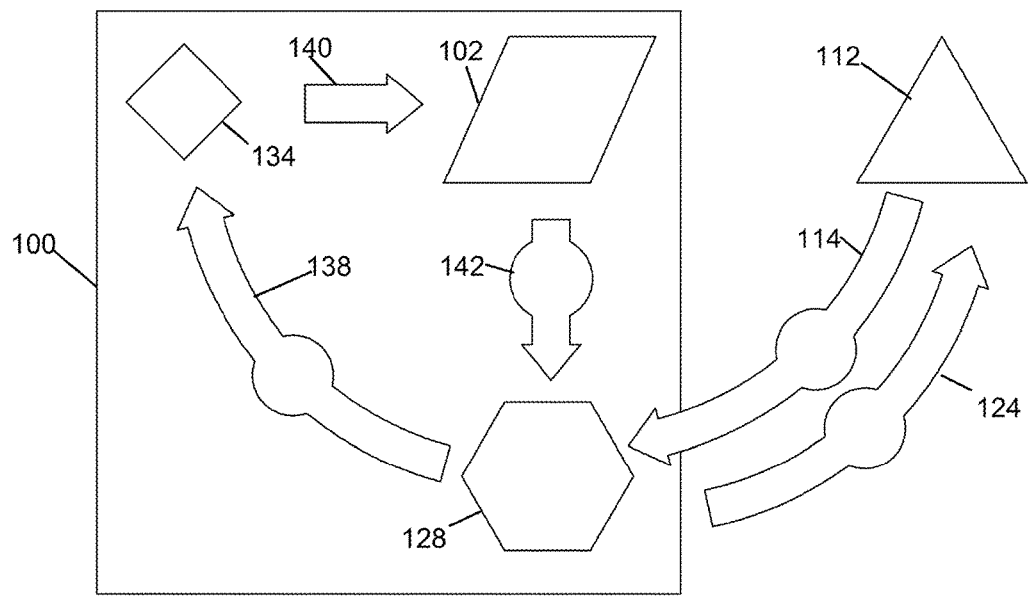
FIG. 2C is a flow chart that symbolically shows the main steps carried out by the Warehouse Management System when a customer's order is received.

FIG. 2C is a flow chart that focuses on the order fulfillment process at the warehouse level symbolically showing the main steps carried out in a non-automated warehouse when a customer's order is received. Customer 112 sends an order 114, which is received by WMS 128. The WMS then generates a picking note 138 that comprises a list of the items, quantities, addresses, priorities and other information. The items 140 are individually picked up by a worker from their addresses 134 in the storage area, the order is consolidated and sent to the RDC 102. Upon completion, the worker sends a picking confirmation message 142 to WMS 128 to confirm that the order has been properly filled and is ready for shipment. The goods are then shipped to customer 112 with a dispatch note 124, which is prepared by WMS 128.

Figure 3:
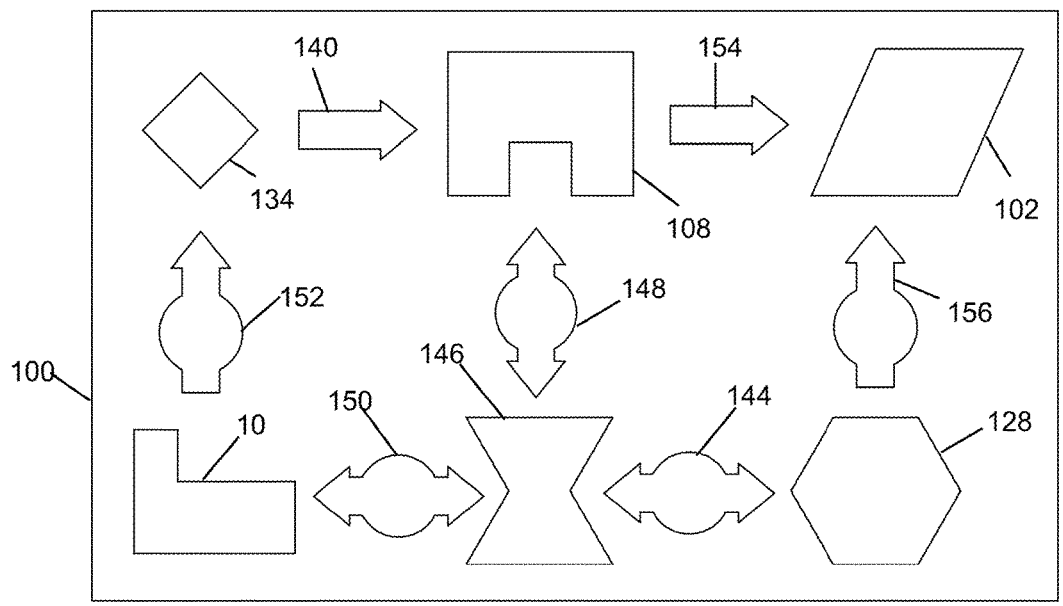
FIG. 3 is a flow chart that symbolically shows the main steps in filling a customer's order that are carried out inside a warehouse by the system of the invention.

FIG. 3 is a flow chart that symbolically shows the main steps in picking and put-away carried out inside a warehouse comprising the system of the invention. When an order is received by WMS 128 it generates a message by communication link 144 with order details like item number, quantity, address in storage, priority and other information to RTTM 146. RTTM 146 analyzes the most effective path 152 and determines the best robot to execute the task. A task message is sent via wireless communication links 150 to the robot 10 and a status message via communication link 148 to the picking station 108 containing order details to be verified when items arrive. Robot 10 periodically reports its progress and status to RTTM 146 via communication link 150. RTTM 146 may change the task assigned to robot 10 when a higher priority task is received from WMS 128. For example, the software in robot 10 calculates its path 152 to address 134 and robot 10 self-navigates to address 134. After picking the item 140 at address 134 the robot navigates to picking station 108 and unloads. In some cases where the order requires only some of the items in the box—the robot will get the same or a new address relayed to it from WMS 128 via communication links 150 and 144 and will navigate to put away the box. Picking station software directs the worker by light indexing or other methods known in the art to consolidate the orders and move the completed orders 154 for shipping through RDC 102. A verification note is then sent from picking station 108 to RTTM 146 via communication link 148. RTTM 146 sends a confirmation message via communication link 144 to WMS128. A delivery note 156 is generated to RDC 102 where it is printed and attached to the shipment box. Wireless communication links 144, 148, and 150 are two way links allowing, for example: the robots to report any obstacles they encounter or technical failures to the RTTM 146; the picking station 108 to query RTTM 146 if an unexpected delay occurs in delivery of an item; or RTTM 146 to report to WMS 128 that the robots are carrying out their missions successfully or if any problems have been encountered.

Using the system of the invention the put away process is carried out mutatis mutandis in the reverse order to the way in which the boxes are picked.

Embodiments of the system comprise software that enables advanced capabilities such as realization of Internet of Things (IoT) scenarios. For example, System components will be able to identify, connect and cooperate with other IoT enabled devices like automated hauling devices, smart entry gates and doors, automatic counting & measure systems, cleaning robots and other warehouse IoT participants. the system of the invention is designated as a self-learning system where, for example, algorithm can track the movement of the robots and organize the routes of traffic in and around the warehouse to reduce congestion and prevent "traffic jams" when the robots are busy filling orders. All of these scenarios are possible without any human intervention and relying on accumulated data which collected as a routine daily basis.

Embodiments of the system are provided with remote access to allow optimization and upgrade of the software and firmware in the different components of the system. In addition all data collected from the servers, robots, etc. can be collected and saved to create "big data" sets that can be analyzed using an "optimization tool box", i.e. specialized software adapted to sort through the big data and compile statistics and detect trends that can be used to optimize the running of the system. Consenting clients might even share their big data in order to compare and learn from each other how to optimize their own system.

All items are stored in the warehouse in boxes. Goods arriving at the warehouse from suppliers are either stored in their original shipping containers or repacked into warehouse specific containers in the RDC before being transported to an address on a shelf in the storage area by the robots.

In order to be able to place the cartons on the shelves or to pick them up, the robot must both grab and lift the carton. Herein the invention is illustrated by a specific embodiment of gripper mechanism; however, in principle the gripper mechanism can be any of the different types known in the art. In this embodiment the robots are equipped with mechanisms, known herein as micro-pallet lifters, which comprise sets of tines and operate in a manner similar to a fork lift. To work with the micro-pallet lifters the bottom of each carton in the warehouse must comprise a relatively thin layer of corrugated fiberboard, known herein as a micro-pallet.

FIG. 4A illustrates the method used by the invention for moving boxes around the warehouse and efficiently stacking them on and picking them from shelves. FIG. 4B is an enlarged view of area "A" in FIG. 4A. At the micro-pallet stand MP1 (see FIG. 1) a micro-pallet 160 is cut from corrugated fiberboard to the dimensions of the bottom of each box 158 that enters the warehouse and is attached to the bottom of the box, for example by gluing. The fiberboard of the micro-pallet is strong enough to support the weight of the contents of the box and the pitch of the corrugations is large enough to allow tines 162 of micro-pallet lifter 32 to be slid into the spaces between the corrugations of the micro-pallet so that as the micro-pallet lifter 32 is activated to rise the box is lifted with it. At the same time that the micro-pallet is attached a box ID label 164 is affixed to the side of the box that will be approached by the robot.

FIGS. 5A to 5D are schematic top perspective, bottom perspective, side, and top views respectively of the robot 10 of the system of the invention. The main components of robot 10 which are shown in these figures are mounted on a frame comprised of two long beams 28 that are rigidly connected together at one end by a shorter beam 12. On top of the frame sits an array of micro-pallet lifters 32 which are used to place boxes on the shelves of the warehouse and to remove them from the shelves. The micro-pallet lifters serve to lift the boxes and as a platform on which boxes are transported to and from the shelves by the robot. Also seen in the figures is a fine positioning sensor 34 used to aid in removing and replacing boxes from the shelves. On top of beam 12 is located a battery case 20 that houses the batteries that power the robot. At the front of the robot is a command module 14 that houses the processor, software, and other electronics that guide the robot and enable it to carry out its assigned tasks. Visible in the figures on the outside surface of command module 14 are a user interface 16 and two ports 18 for charging the batteries. Not shown in the figure are a set of on-board sensors that are located at various locations on the robot to aid the robot in navigation and to identify obstacles. The sensors are of various types, e.g. optical, RFID, magnetic and indoor triangulation system that form a virtual "bubble" around the robot as it travels. Those sensors are also servicing the safety module which allow the robot to be safe enough to operate in a human environment and interact with workers Robot 10 moves along the ground on four wheels. The two rear wheels 30 could be fixed and passive so that they can only rotate about their axles which are perpendicular to the axis of the long beams 28 of the frame and are "dragged along" by the front wheels. In another embodiment the rear wheels could be multi directional wheels which allow movement to any direction, about an axis vertical to the floor. In this later embodiment the front driving wheels 22 dictate the steering angle and differential speeds of the rear wheels. The two front wheels 22 can be independently rotated in any direction by drive and steering units 24. With this arrangement the robot is completely autonomous and can be steered by its control system to any location on the floor of the warehouse without the use of a track, embedded wire or any other arrangement to guide it. The drive and steering units 24 are attached to the robot by means of arm units 26. As will be described herein below, arm units 26 can expand, contract, and have other degrees of freedom that allow the robot to raise itself off the floor and to move up and along the shelves in order to place or pick cartons from the shelves.

Figure 5B:
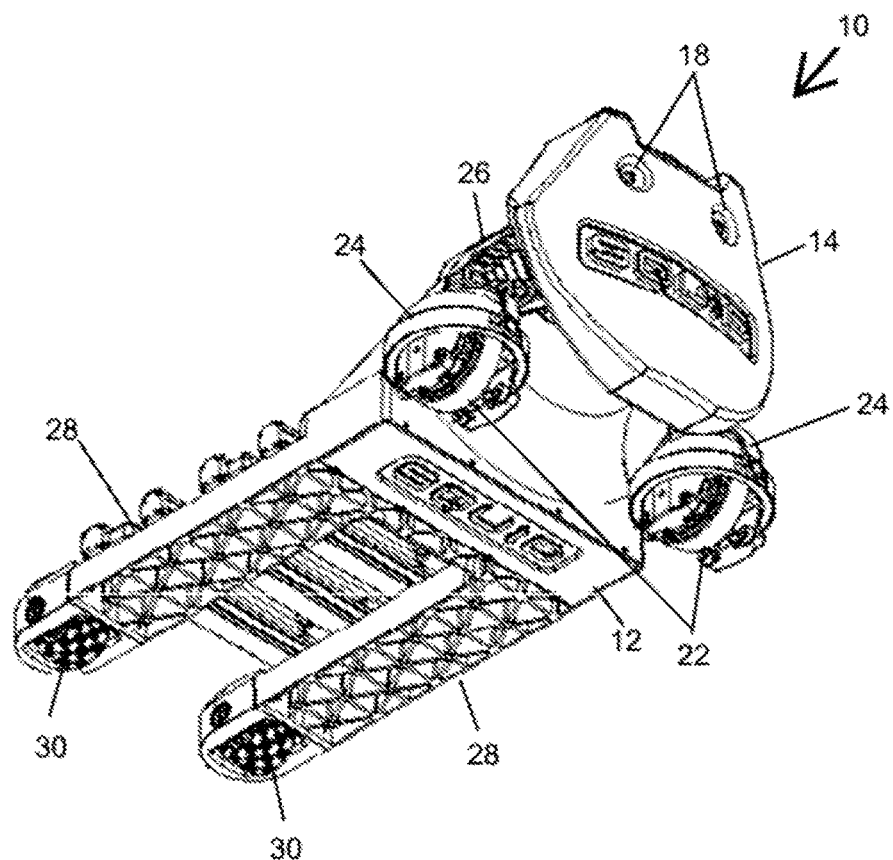
Figure 5C:
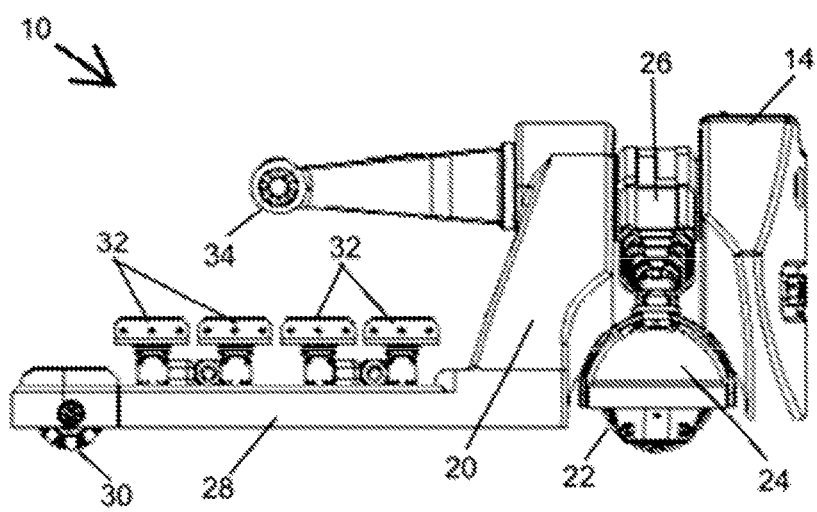
Figure 5D:
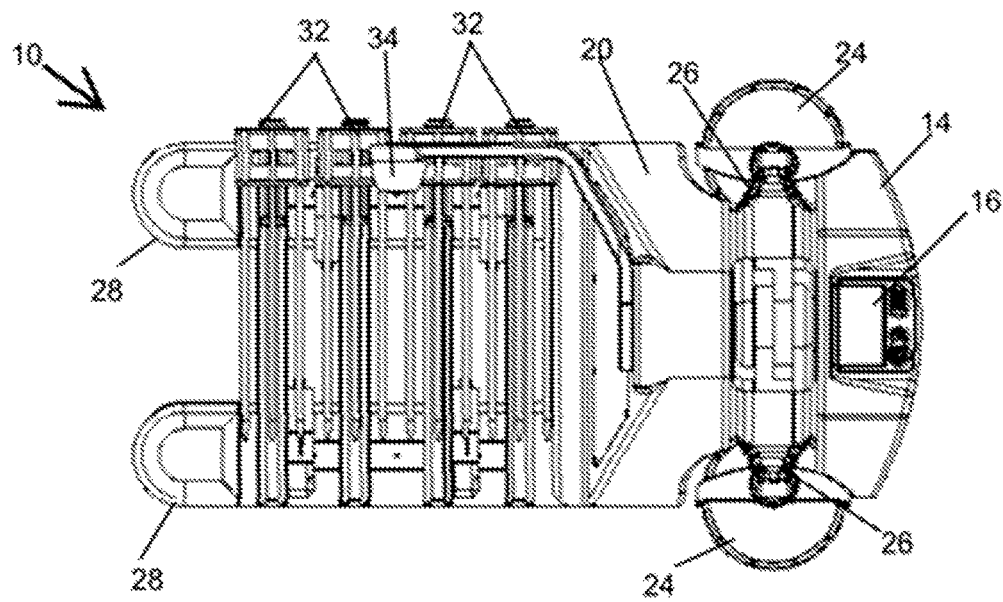
Figure 5E:
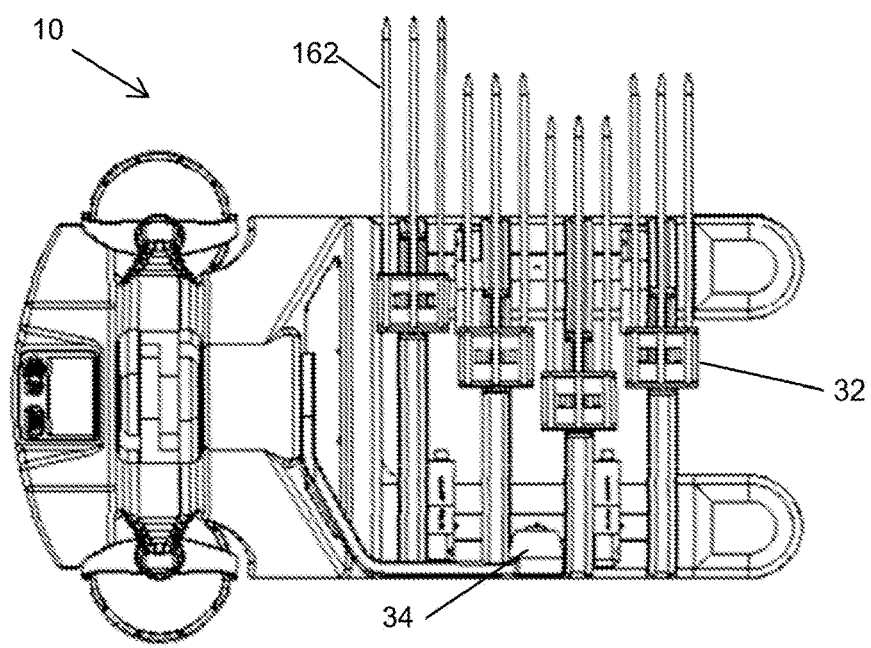
FIG. 5E is a schematic top view of a robot of the system of the invention showing the micro-pallet lifters.

FIG. 5E is a schematic top view of robot 10 showing the micro-pallet lifters 32. The embodiment of robot 10 shown in the figures has four micro-pallet lifters 32 each comprising three tines 162. Each micro-pallet lifter can be operated independently of the others thereby allowing the robot to handle different sized boxes and maximizing the efficient use of shelf space since the boxes can be stacked on the shelves in stacks that are very close to each other. There is no need to leave space between the stacks to introduce the arm like appendages employed on conventional robots to grab the boxes on either side in order to lift and insert or remove them from the shelf.

In addition to being separately operated the micro-pallet lifters 32 and also the fine positioning sensor 34 can be turned by 180 degrees allowing a robot to access both sides of an aisle. It is noted, that as with other components of the system, embodiments of the robot 10 can comprise more or less than four micro-pallet lifters 32 and each four micro-pallet lifter can comprise more or less than three tines 162.

Figure 6A:
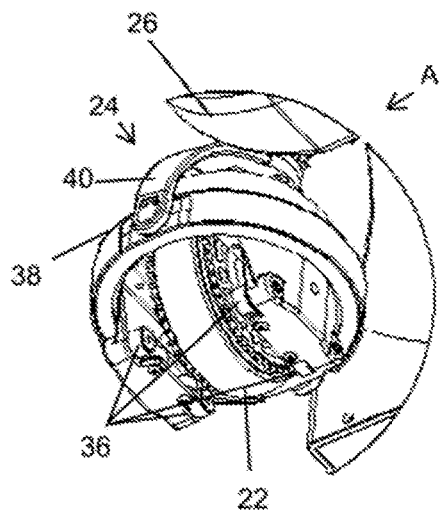
FIGS. 6A to 6C are schematic views of the robot of the invention and enlarged views showing a front wheel and steering assembly.
Figure 6A:
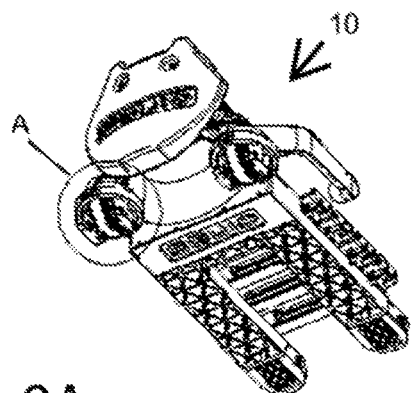
Figure 6B:
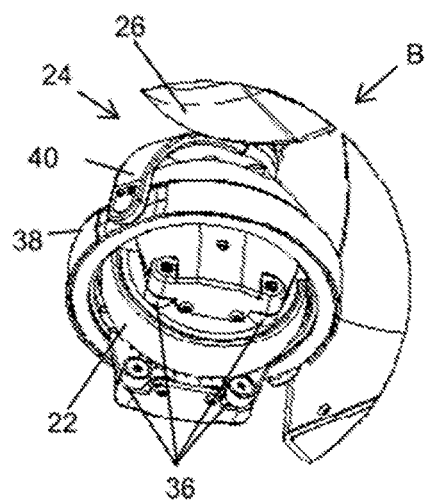
Figure 6B:
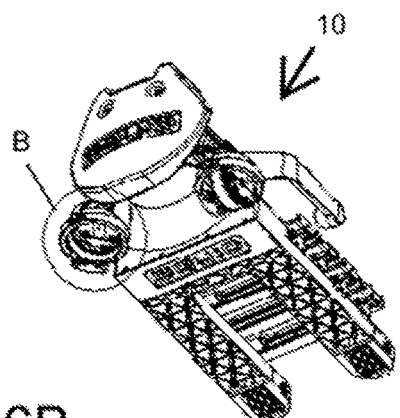
Figure 6C:
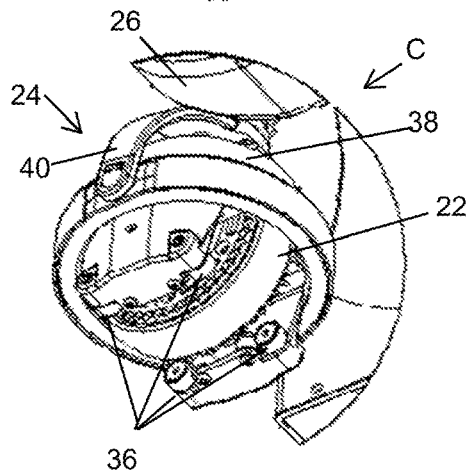
Figure 6C:
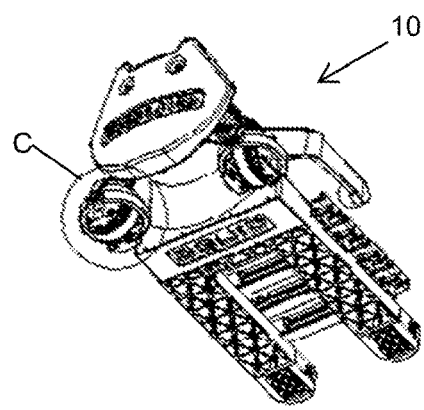

The front wheels 22 of robot 10 can be independently rotated 360 degrees about an axis vertical to the floor by their respective drive and steering units 24. The right sides of FIGS. 6A to 6C are schematic views of the robot showing its right front wheel 22 turned by drive and steering unit 24 from zero degrees (with relation to the its direction of travel) in FIG. 6A to forty-five degrees in FIG. 6B to 90 degrees in FIG. 6C. The left sides of these figures are enlarged views of showing a front wheel 22 and drive and steering unit 24 for each of the three positions.

Drive and steering assembly 24 comprises a hemispherical shell 38 which houses wheel 22 and two electric motors and gear assemblies (not shown).

The steering assembly is comprised of one of the motor and gear assemblies, which turns the drive wheel up to 360 degrees around a vertical axis (when the robot is on the floor), thereby rotating wheel 22 about this vertical axis to steer the robot. The drive assembly comprises the second of the motor and gear assemblies, which is adapted to rotate the wheel only around a horizontal axis (when the robot is on the floor) thereby causing the robot to move in the direction that the wheel has been pointed. At least the motor of the drive assembly is a variable speed motor, which allows the robot to travel at different speeds. When travelling on the ground it is also possible to steer the robot by activating the drive motors to produce differential rotational speeds of the two front drive wheels.

Shell 38 is attached to the end of arm unit 26 by a one-axis gimbal 40. Also shown in the figures are small wheels 36 that are attached to shell 38 arranged in groups on either side of the wheel 22. As wheel 22 travels along one of the rails attached to the shelving in the warehouse, wheels 36 move along the sides of the rail as shown in FIGS. 9A and 9B, thereby mechanically locking wheel 22 and the robot 10 to the rails.

Figures 7A, 7B:
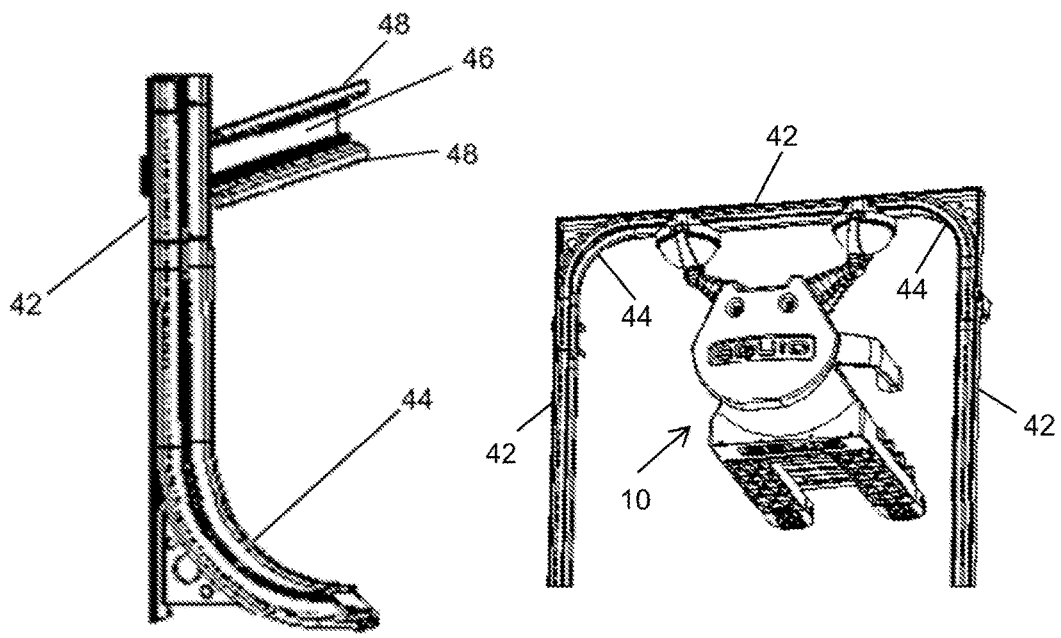
FIG. 7A schematically shows the rails of the system of the invention.
FIG. 7B schematically shows an embodiment of the rail system, which allows a robot to travel on the rails from one side of an aisle to the other side without returning to the floor.

FIG. 7A schematically shows the rails of the system of the invention. The vertical and horizontal rails 42 have identical geometry. They are made from "U"-shaped profiles—that could be made from different material or with different thickness depending on the strength required—with a channel 46 in which the front wheels 22 of robot 10 travel and two flanges 48 on either side of channel 46. A curved piece of rail called a terminal 44 is attached to the bottoms of the vertical rails where they reach the ground. This is the only place where robots 10 can connect or disconnect from the rails 42 in order to climb to or descend from the shelves.

The rails are designed to be easily attached to the existing shelving in the warehouse by conventional means such as bolts, fasteners or quick-lock mounts. Although a main idea behind the present invention is to retrofit existing warehouses, the system can obviously be installed in new structures, in which case the rails of the invention can be manufactured as an integral feature of the shelving system. In an embodiment of the system the rails are not attached to the shelving but are constructed as free standing structures that stand next to the shelving.

FIG. 7B schematically shows an embodiment of the rail system in which terminal pieces 48 are installed at the top of vertical rails 42. A short horizontal piece of rail connects the two terminal pieces to allow a robot 10 to travel on the rails from one side of an aisle to the other side without returning to the floor. The horizontal piece of rail can be attached to the ceiling.

FIGS. 8A to 8G symbolically show different stages in the process of the robot of the system of the invention leaving the floor of the warehouse and climbing a vertical rail attached to the shelving. In order to complete its mission of removing a box from (or delivering a box to) a specific location on a shelf the robot travels vertically with both front wheels in the same vertical rail and travels horizontally with one of its front wheels in a horizontal rail that is attached to the shelf on which the box is located and the other front wheel in a horizontal rail that is attached to the shelf above the first shelf.

Figure 8A:
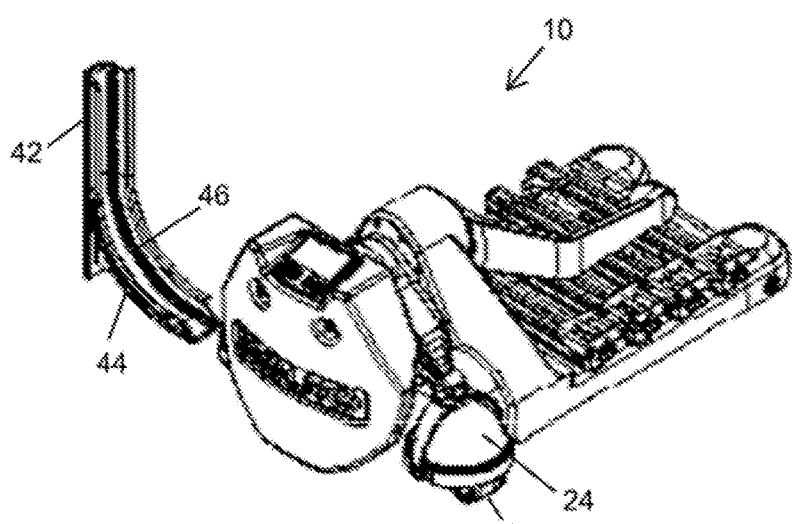

In FIG. 8A the robot 10 has used the set of on-board sensors to travel using anchor point navigation to the designated vertical rail 42 that it has been instructed to ascend to reach one of the shelves in the warehouse. A sensor, e.g. a RFID sensor, that is activated as robot 10 approaches the designated terminal 44 stops the robot at an exact position relative to terminal 44. The electric steering motors in the drive and steering units 24 are activated to turn both front wheels 22 by ninety degrees so that they are exactly facing the "U"-shaped channel 46 in terminal 44.

Figure 8B:
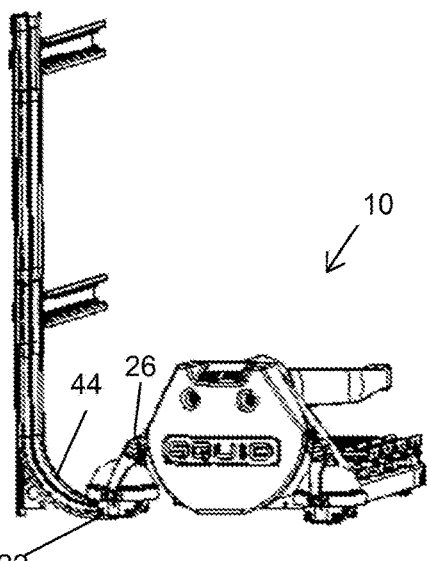

In FIG. 8B a synchronized movement takes place between the driving motor of the right front wheel 22, and electric motors and actuators (not shown in the figures) inside the right arm unit 26 that are responsible for changing the length and angle of the arm unit advancing the right wheel into the "U"-shaped channel 46 in terminal 44 while the robot 10 remains in position on the floor. As right wheel 22 enters the terminal it is geometrically locked to the rail as will be described in relation to FIGS. 9A and 9B herein below.

Figure 8C:
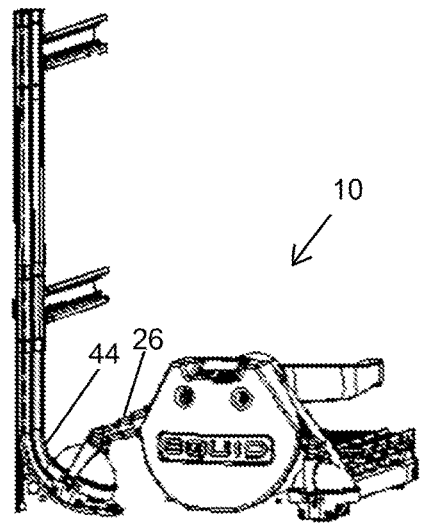

In FIG. 8C the synchronized movement between the driving motor of the right front wheel 22 and right arm unit 26 continues to extend the right arm unit as right wheel 22 moves further up terminal 44.

Figure 8D:
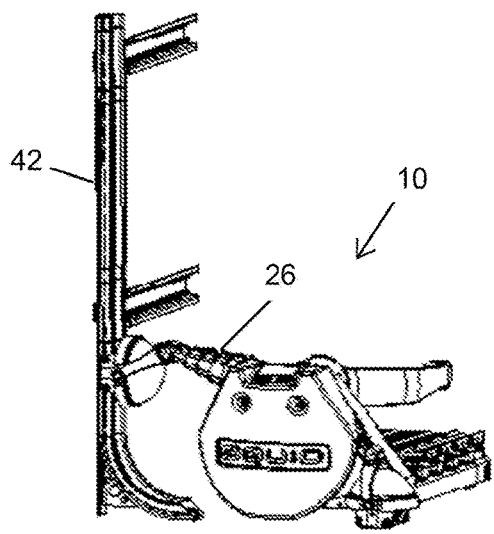
Figure 8E:
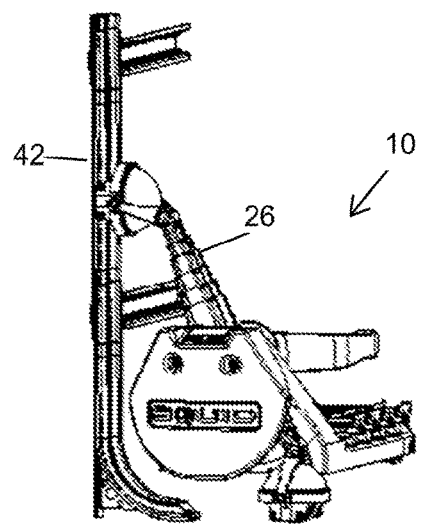

In FIG. 8D right arm unit 26 extends further and swings upwards while right wheel 22 moves out of the terminal 44;

In FIG. 8E the right wheel has advanced further up vertical rail 42 and starts to pull the robot 10 slightly off the ground. At the same time the left arm unit 26 is activated to cause the left front wheel to push against the ground pushing the body of the robot closer to terminal 44.

In FIG. 8F left front wheel 22 moves into the "U"-shaped channel 46 in terminal 44 and is locked to the rail.

In FIG. 8G both front wheels are travelling upwards in the "U"-shaped channel 46 in vertical rail 42.

FIG. 9A schematically shows a bottom view of the shell 38 of drive and steering unit 24. The wheel 22 and all other components of the drive and steering unit have been removed to show the small wheels 36 that lock the robot to the rails. As can be seen on each side of the shell 38 there is a group of five small wheels 36. Each group comprises two wheels mounted with their axles parallel to the sides of the shell and three wheels mounted with the axles perpendicular to the sides of the shell. FIG. 9B schematically shows how, when the drive wheel 22 enters the U shaped channel 46 in rail 42, the small wheels 36 lock the drive wheel on the rail. The two wheels mounted with their axles parallel to the sides of the shell roll along the rail pressing against opposite sides of the outside of the channel 46 to prevent twisting and two of the other wheels roll along the rail pressing on flange 48 from above and the third wheel roll along the rail pressing on flange 48 from below to prevent the robot from falling off the rail.

FIG. 10 schematically shows a junction 50 between vertical and horizontal rails. Junction 50 is comprised of an open circular area centered at the intersection between the vertical and horizontal rails. A section of rail, known herein as a bridge 52, pivots about the center of this circular area to alternately connect the two sections of the vertical rail or the two sections of the horizontal rail. Bridge 52 has the same profile as the rail so the robot is consistently locked to the rails as described before. The direction of bridge 52 is changed either by the drive and steering unit in case the robot is on the bridge or a special push rod located at the junction, which the rollers 36 push against when the robot gets close to the junction.

FIGS. 11A to 11E schematically show how the robot changes from travelling in a vertical direction to travelling in a horizontal direction at a junction between vertical and horizontal rails.

Figure 11A:
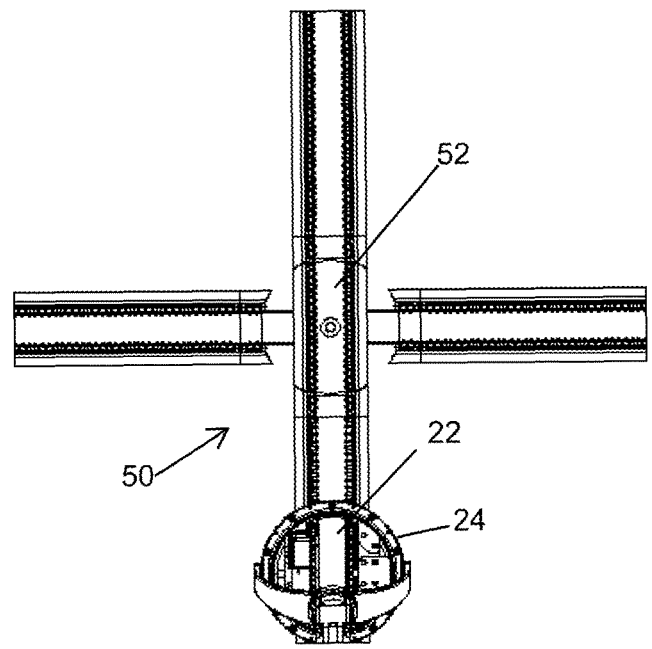
FIGS. 11A to 11E schematically show how the robot changes from travelling in a vertical direction to travelling in a horizontal one at a junction between vertical and horizontal rails.

In FIG. 11A a front wheel of the robot is shown approaching a junction 50. The bridge 52 in junction 50 is aligned in the vertical direction, which is also the direction of travel of the robot. In FIGS. 11A to 11D the hemispherical shell of the drive and steering unit 24 is removed in order to show the wheel 22.

Figure 11B:
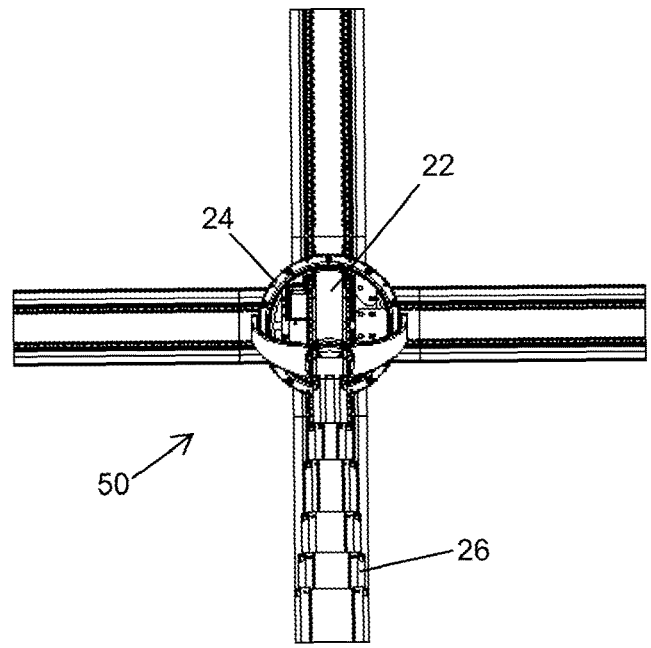

In FIG. 11B the wheel 22 has arrived at junction 50 and pauses in its motion in the vertical direction on top of bridge 52 centered on the junction.

Figure 11C:
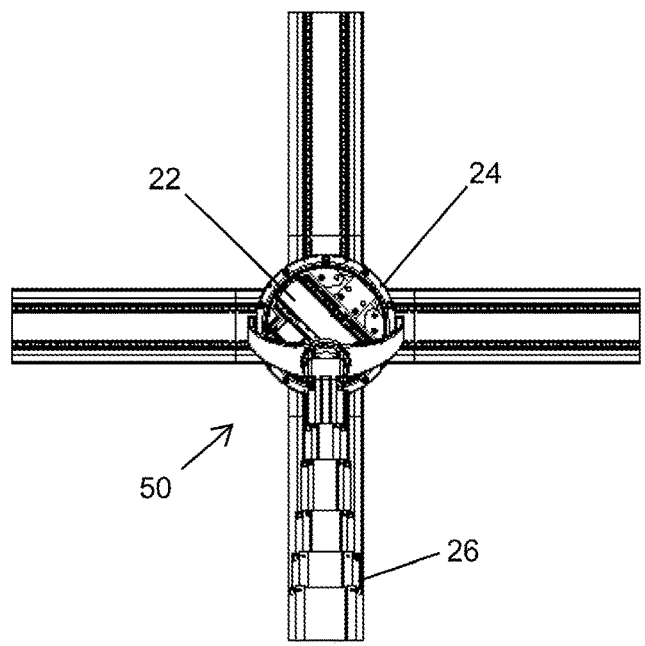

In FIG. 11C drive and steering unit 24 is activated causing wheel 22 and bridge 52 to rotate towards the horizontal direction.

Figure 11D:
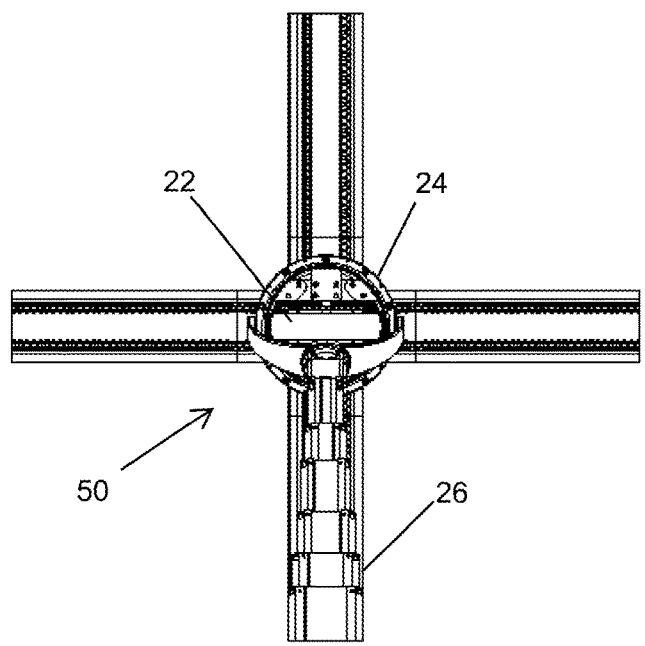

In FIG. 11D the wheel 22 and bridge 52 have been rotated ninety degrees. Bridge 52 now connects the two sections of the horizontal rail across junction 50 and, after the same sequence of events has taken place for the second wheel 22 at the adjacent junction (both wheels can be rotated simultaneously) in the vertical rail, the robot is able to travel in the horizontal direction.

Figure 11E:
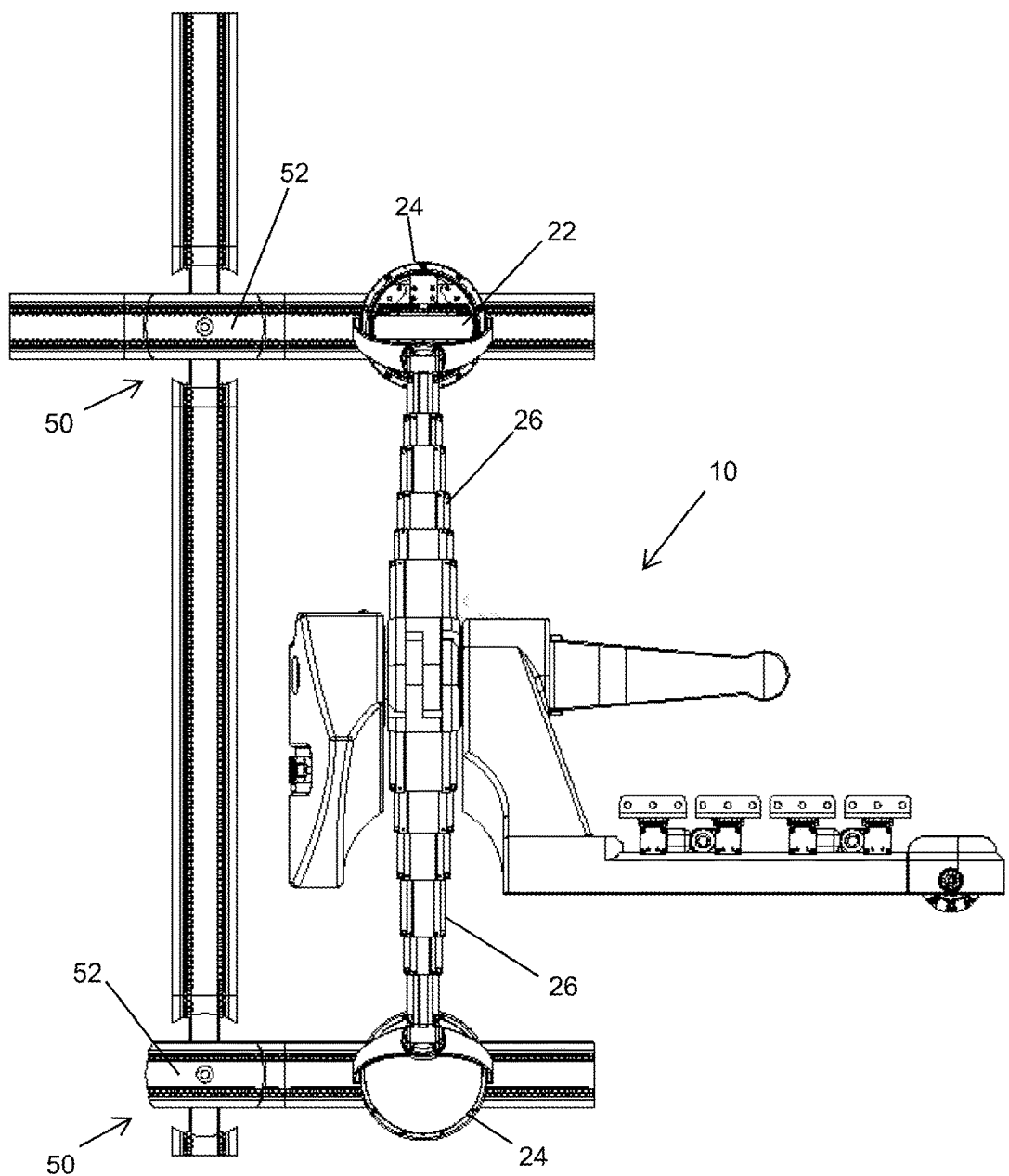

In FIG. 11E the robot 10 is shown travelling along two adjacent horizontal rails towards its target location on the shelf.

If the robot is driving on the rails (either horizontal or vertical) and approaches a junction that another robot has visited before it, then the bridge will be oriented perpendicular to its direction of travel. In this case when the robot approaches the junction the leading small wheel 36 will push against a push rod in the rail, which activates a mechanism (not shown in the figures) that will automatically rotate the bridge by ninety degrees to allow the robot to enter the junction.

Figure 12A:
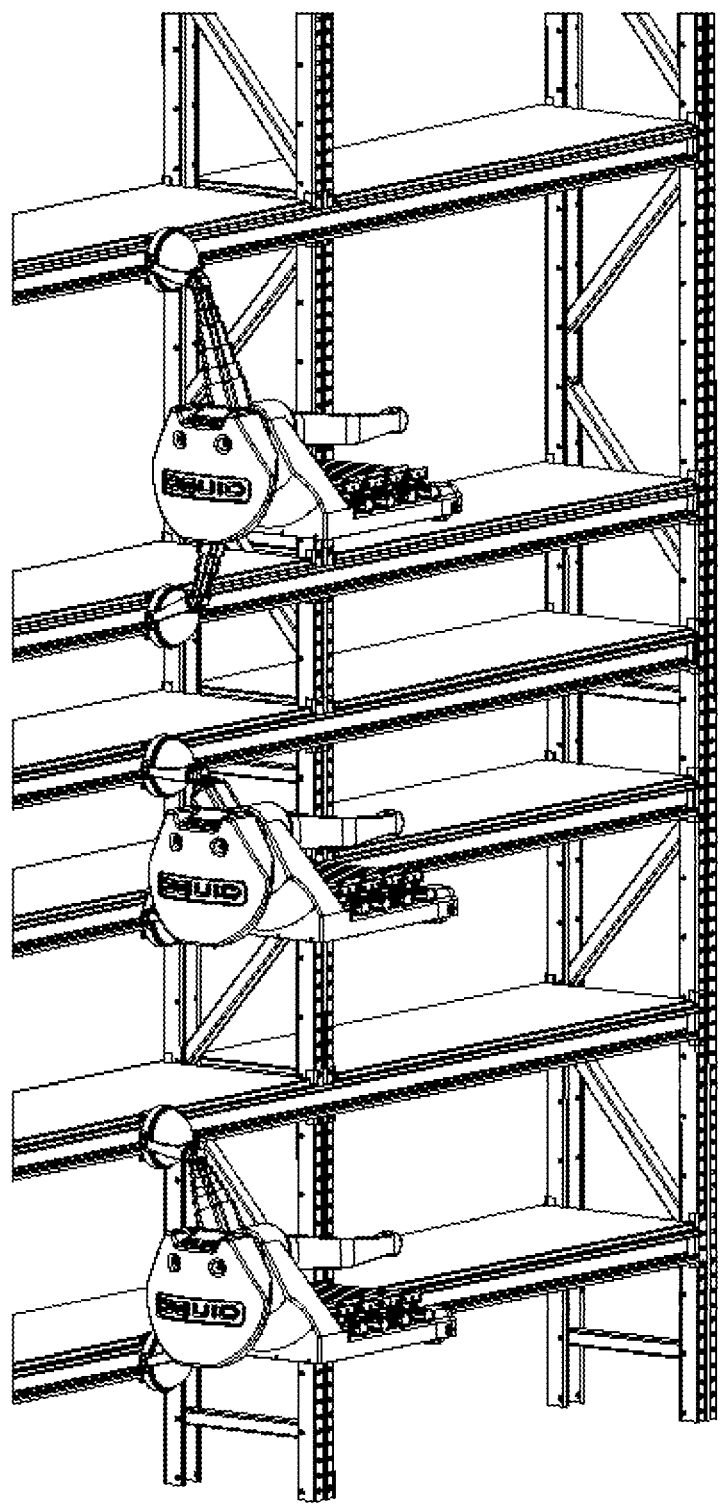
FIG. 12A schematically shows how the extension of the arm units allows the robot to adapt itself to travel on shelf systems having variable spacing between shelves.

The lengths of the two arm units 26 of the of the robot 10 can be extended or retracted individually allowing the robot to adapt itself to travel on shelf systems having variable spacing between shelves as shown in FIG. 12A.

Figure 12B:
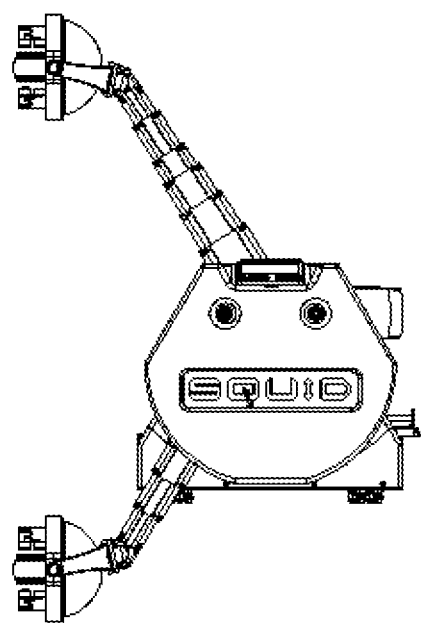
FIGS. 12B and 12C schematically show how the angles that the two arm units of the robot make with the horizontal can be adjusted independently allowing the robot to adjust its distance from the rails.
Figure 12C:
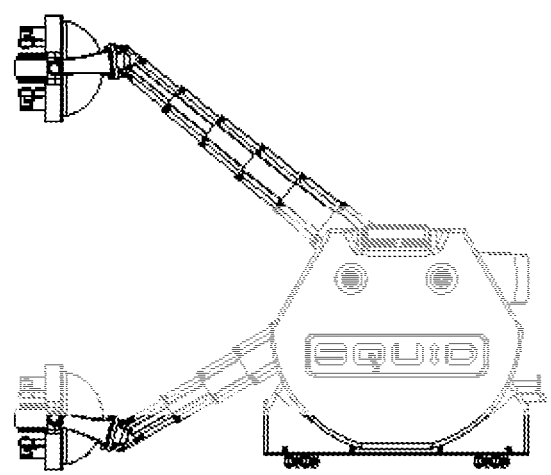

In addition the angles that the two arm units 26 of robot 10 make with the horizontal can be adjusted independently allowing the robot to adjust its distance from the rails as shown in FIGS. 12B and 12C in order to provide flexibility when engaging a box.

Figure 13A:
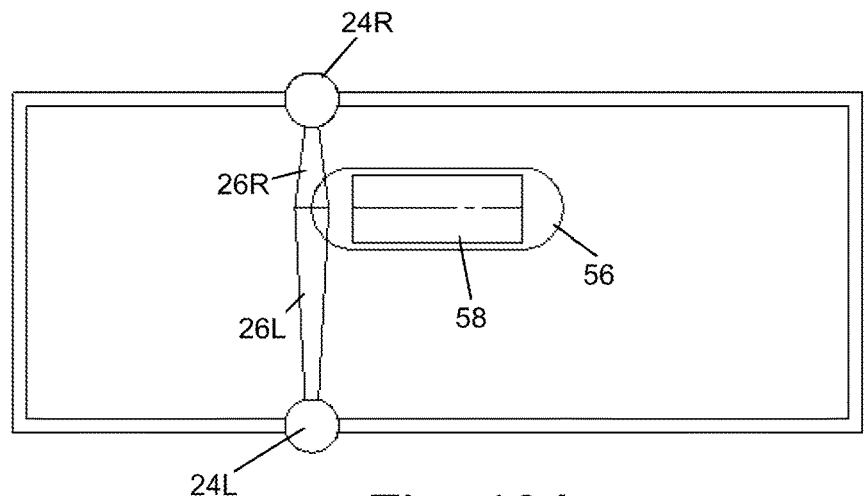
FIGS. 13A to 13C schematically show how the robot can adjust its orientation with respect to a shelf in order to add or remove a box from different heights and orientations on the shelf.
Figure 13B:
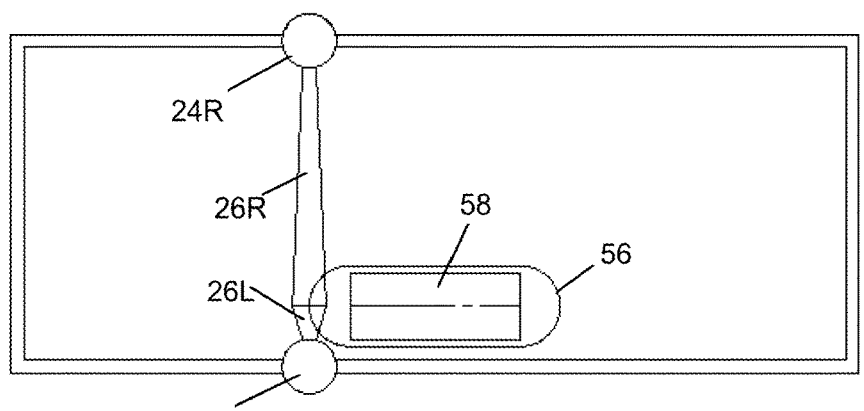
Figure 13C:
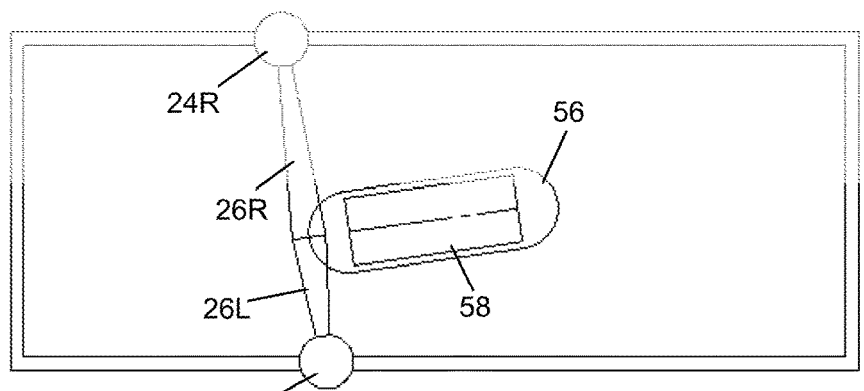

The combination of the capability of independently changing the lengths and angles of the two arm units 26 and the capability of activating the two drive and steering units 24 independently allows the robot, with the assistance of fine positioning sensor 34, to place a box on a shelf or remove it from any height or any orientation on the shelf as shown in FIGS. 13A to 13C.

In FIG. 13A the length of the right arm unit 26R is shortened and the length of the left arm unit 26L is lengthened to position the robot (symbolically shown by ellipse 56) opposite a box 58, e.g. the top box in a stack of three boxes, located high up on the shelf.

In FIG. 13B the length of the right arm unit 26R is lengthened and the length of the left arm unit 26L is shortened to position the robot (symbolically shown by ellipse 56) opposite a box 58 resting on the surface of the shelf.

In FIG. 13C box 58 is resting on the shelf at an angle relative to the rails. In this case, in addition to making adjustments to the lengths of arm units 26R and 26L, the right and left drive and steering unit 24R and 24L are activated to move the right and left wheels different distances along their respective rails, thereby tilting the robot at the same angle as the box relative to the shelf.

FIGS. 14A to 14G schematically show how the fine positioning feature of the system of the invention allows a robot to very precisely locate and pick or place a box on a shelf.

Figure 14A:
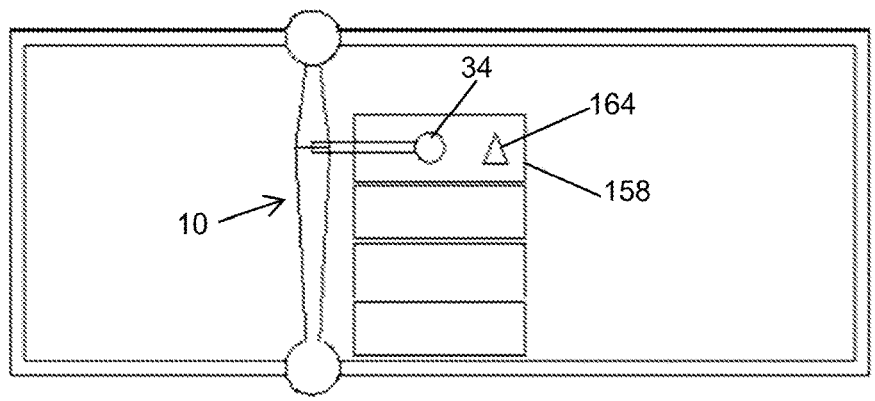
FIGS. 14A to 14G schematically show how the fine positioning feature of the system of the invention allows a robot to very precisely locate and pick or place a box on a shelf.

FIG. 14A shows robot 10 positioning a box 158 on top of a stack of three other boxes on a shelf in the storage area of the warehouse. Once the box is positioned correctly and before the tines of the micro-pallet lifters are withdrawn from the micro-pallet attached to the bottom of box 158, the fine positioning sensor 34 on the robot determines and record the x,y,z coordinates in a coordinate system defined by the rails. An image 166, shown schematically in FIG.

Figure 14B:
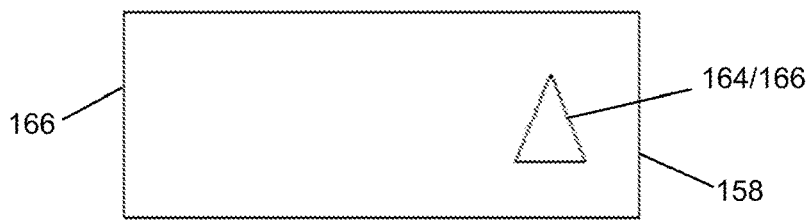

14B, is taken of the box 158 and identification parameter, in this case an attached label 164, which is identified in FIG. 14B by the numerals 164/166 to indicate that this is the label that appears in image 166. The x,y,z coordinates and the image 166 of the box on the shelf that are recorded by the robot when putting away the box are sent to RTTM server 146 and, together with other information about the box and its contents are stored in a database. The robot then leaves the box on the shelf ready to execute another mission.

Figure 14C:
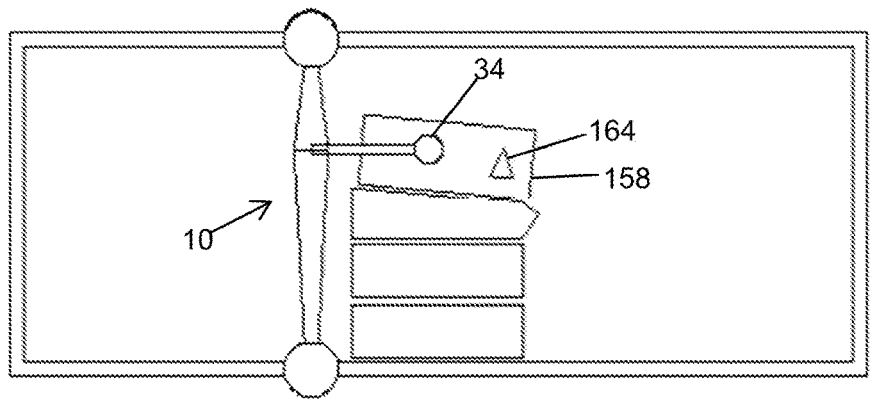
Figure 14D:
Figure 14E:
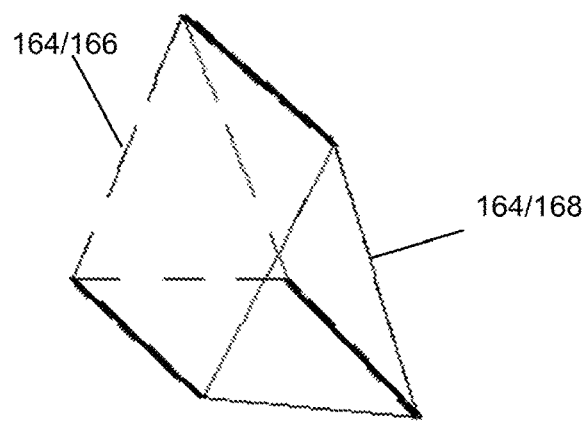
Figure 14F:
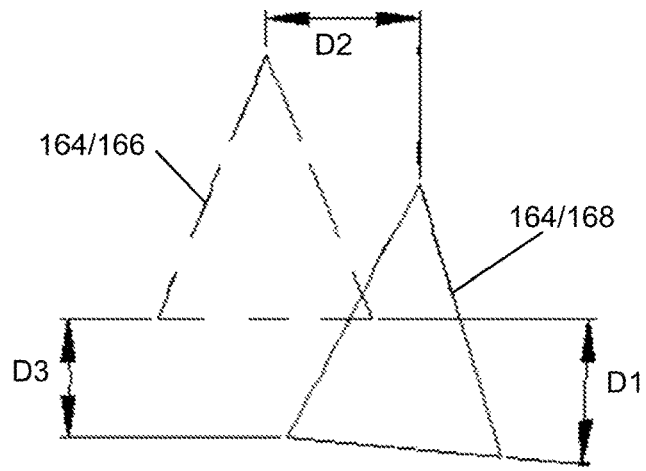

After some time, a robot 10 is sent to pick this box and to bring it to a picking station. In the time that has intervened between when the box was placed on the stack and the time it is to be picked, the box beneath the one to be picked has partially collapsed. As a result when the robot arrives at the designated x,y,z address in the storage area, which was recorded when box 158 was put away, the situation is as shown in FIG. 14C and the micro-pallet lifters cannot be activated to raise the box off the stack without adjusting the orientation of the robot relative to the original XYZ position. In order to make the adjustment an image 168 of the box is taken by the fine positioning sensor 34. As shown in FIG. 14 D, image 168 is overlaid on top of the image 166 that shows the original orientation of the box. Image processing algorithms then isolate identical features in the two images, e.g. the box ID labels 164/166 and 164/168, as shown in FIG. 14E and then calculate the shift between the two images to derive the values of corrections that must be applied to the coordinates x,y,z measured when the box was originally placed on the shelf. The corrections required are shown in FIG. 14F. They are D1, which represents the angle between the bottoms of the box label in the two images; D2, which is the shift in the x direction; and D3, which is the shift in the y direction.

Figure 14G:
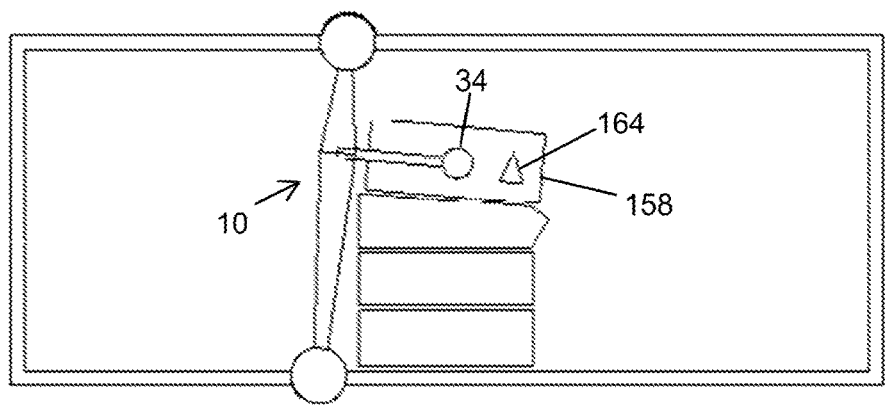

These corrections are used by the robot's processor for fine adjustment of the two arm units in order to orient the plane of the tines of the micro-pallet lifters parallel to that of the micro-pallet as shown in FIG. 14G and described herein above with respect to FIG. 14C.

Although embodiments of the invention have been described by way of illustration, it will be understood that the invention may be carried out with many variations, modifications, and adaptations, without exceeding the scope of the claims.

The invention claimed is:

1. An automatic system for picking and placing boxes on shelves in a warehouse, the system comprising:
   a. a set of autonomous mobile robots, each robot comprising two front driving wheels;
   b. a network of vertical and horizontal rails, wherein the network of vertical and horizontal rails form a shelving system; or the network of vertical and horizontal rails are parallel to vertical and horizontal supports of shelves in an existing shelving system in the warehouse; and
   c. a Real Time Traffic Management (RTTM) server, said RTTM server is a central processing server, configured to communicate with the robots and other processors and servers in the warehouse;
   wherein each robot comprises:
      components configured to engage and mechanically secure the two front driving wheels to the vertical and horizontal rails allowing the robot to travel on the network of rails; and
      a set of on-board sensors, a processor, software, and other electronics configured to provide the robot with three-dimensional navigation and travel capabilities, the three-dimensional navigation and travel capabilities enable the robot to navigate and travel autonomously along the floor, up and down the vertical-rails rails, and along the horizontal rails of the network of rails to reach an exact location on the floor or shelving system of the warehouse.

2. The automatic system of claim 1 comprising a modular architecture that is configured to be integrated with an already in-use facility thereby allowing a high level of implementation flexibility and ongoing scalability.

3. The automatic system of claim 1, comprising at least one picking station, the at least one picking station comprising: a processor, terminal screen and software dedicated to interface with other the processors in the automatic system in order to assist human workers with picking or putting away merchandise.

4. The automatic system of claim 1, wherein the robots have recoverable communication capability that enables the robots to carry on with their mission if communication with the RTTM server, picking stations, or other robots is temporarily lost.

5. The automatic system of claim 1, wherein the rails of the network of vertical and horizontal rails, or are configured to form a free standing structure that stands in parallel to the existing shelving.

6. The automatic system of claim 1, wherein the network or rails is configured to enable each robot to cross from one side of an aisle to the other side of the aisle without the need to go down to the floor.

7. The automatic system of claim 1 wherein the RTTM comprises software that generates tasks, prioritization, traffic control, and energy management instructions, which the RTTM sends to the individual robots.

8. The automatic system of claim 1, wherein real-time communication between all robots, picking stations, and RTTM is handled over industrial grade routers using secured wireless protocol.

9. The automatic system of claim 1, wherein each box stored in the warehouse has a micro-pallet made from corrugated fiberboard attached to a bottom of the box.

10. The automatic system of claim 1, wherein the processors in the robots, RTTM, and picking stations comprise software that is configured to provide at least one of the following advanced capabilities:
   a. realization of Internet of Things (IoT) scenarios;
   b. self-learning; and
   c. accumulating and analyzing big data sets.

11. The automatic system of claim 1, further comprising a junction between vertical and horizontal rails, the junction is comprised of an open circular area centered at an intersection of the vertical and horizontal rails and a short piece of rail, the short piece of rail is configured to pivot about the center of the circular area such that the short piece of rail is alternately lined up with one or two sections of the vertical rail, or one or two sections of the horizontal rail.

12. The automatic system of claim 11, wherein each robot is able to change its direction of travel on the network of vertical and horizontal rails from vertical to horizontal or vice versa, by the robot stopping with its front wheels on the short piece of rail in two adjacent junctions and then rotating the front wheels by ninety degrees.

13. The automatic system of claim 1, wherein the robots comprise:
   a. a frame;
   b. a gripper mechanism attached to the top side of the frame that is configured to pick up and place boxes;

c. a fine positioning sensor used to aid in removing boxes from and placing boxes on the shelves;
d. a battery case that houses rechargeable batteries to power the robot;
e. at least one rear wheel attached to the bottom of the frame; and
f. two drive and steering units, each unit comprising:
   one front driving wheel and components configured to rotate the front driving wheel at least 360 degrees about an axis vertical to the floor, the front driving wheel and components steer the robot and to rotate the front driving wheel about a horizontal axis causing the robot to move in the direction that the front driving wheel is pointing; and
   the drive and steering units are attached to the robot by means of arm units configured to expand and contract, the arm units having multiple degrees of freedom that allow the robot to: engage a vertical rail, raise itself off the floor, and to move up, down, and along the network of vertical and horizontal rails.

14. The automatic system of claim 13, wherein the gripper mechanism comprises an array of micro-pallet lifters, wherein each micro-pallet lifter in the array can be operated independently thereby allowing the robot to handle different sized boxes in order to maximize the efficient use of shelf space.

15. The automatic system of claim 13, wherein the processor in each robot comprises dedicated software and algorithms that are configured to enable the robot to execute navigation, driving, and fine positioning procedures, to pick and put boxes, and to monitor the charge of the rechargeable batteries.

16. The automatic system of claim 15, wherein the processor of each robot is pre-loaded with dedicated software which includes the warehouse layout, routes, intersections, and designated areas.

17. The automatic system of claim 16, wherein the processor, software, and set of onboard sensors are configured to enable each robot to employ anchor point navigation method to carry out tasks assigned to it by the RTTM server.

18. A robot having three-dimensional navigation and travel capabilities that enable the robot to navigate and travel along the ground, and up and down vertical rails, and along horizontal rails of a network of rails, the robot comprising:
a. a frame;
b. a gripper mechanism attached to the top side of the frame that is configured to pick and place boxes;
c. a fine positioning sensor used to aid in removing and placing boxes from or on the shelves;
d. a battery case that houses rechargeable batteries to power the robot;
e. a command module that houses a processor, software, and other electronics to guide the robot and enable it to carry out its assigned tasks;
f. a set of on-board sensors that are located at various locations on the robot to aid the robot in navigation and to identify obstacles;
g. at least one rear wheel attached to the bottom of the frame; and
h. two drive and steering units each unit comprising:
   one front driving wheel and components configured to: rotate the front driving wheel at least 360 degrees about an axis vertical to the steer the robot, and to rotate the front driving wheel about a horizontal axis causing the robot to move in the direction that the front driving wheel is pointing,
   the drive and steering units are attached to the robot by means of arm units configured to expand and contract, the arm units having multiple degrees of freedom that allow the front driving wheels of the robot to: engage a vertical rail by means of the front driving wheels, raise itself off the floor, move up and down the vertical rails, and move along the horizontal rails.

* * * * *